United States Patent [19]

Hisatake et al.

[11] Patent Number: 5,731,858
[45] Date of Patent: Mar. 24, 1998

[54] REFLECTION TYPE LIQUID CRYSTAL DISPLAY DEVICE AND METHOD OF MANUFACTURING THE SAME

[75] Inventors: Yuzo Hisatake; Ryoichi Watanabe; Makiko Sato; Hitoshi Hatoh, all of Yokohama; Akio Murayama, Fukaya, all of Japan

[73] Assignee: Kabushiki Kaisha Toshiba, Kawasaki, Japan

[21] Appl. No.: 763,103

[22] Filed: Dec. 10, 1996

Related U.S. Application Data

[62] Division of Ser. No. 544,077, Oct. 17, 1995.

[30] Foreign Application Priority Data

Oct. 18, 1994 [JP] Japan .................... 6-251771
Jan. 17, 1995 [JP] Japan .................... 7-004904

[51] Int. Cl.[6] .................... G02F 1/1335; C09K 19/60
[52] U.S. Cl. .................... 349/112; 349/113; 349/165
[58] Field of Search .................... 349/64, 111, 112, 349/113, 165

[56] References Cited

U.S. PATENT DOCUMENTS

| | | | |
|---|---|---|---|
| 4,266,859 | 5/1981 | Togashi et al. | 349/112 |
| 4,648,691 | 3/1987 | Oguchi et al. | 349/112 |
| 5,204,765 | 4/1993 | Mitsui et al. | 349/113 |
| 5,548,425 | 8/1996 | Adachi et al. | 349/113 |
| 5,629,784 | 5/1997 | Abileah et al. | 349/112 |

FOREIGN PATENT DOCUMENTS 2-18521  1/1990  Japan ................... 349/113

*Primary Examiner*—William L. Sikes
*Assistant Examiner*—Toan Ton
*Attorney, Agent, or Firm*—Cushman, Darby & Cushman IP Group of Pillsbury, Madison & Sutro LLP

[57] ABSTRACT

A reflecting type liquid crystal display device having, a first substrate provided on one main surface thereof with a first electrode comprising a plurality of pixel electrodes arrayed in a matrix form and a wiring interposed between these pixel electrodes, the first substrate being disposed on an observation side, a second substrate provided on one main surface thereof with a second electrode and disposed to face the first substrate in such a manner that the surface bearing the second electrode faces to the surface bearing the first electrode, a liquid crystal composition layer interposed between the first substrate and the second substrate, and a white reflecting layer formed on a region of the surface of the first substrate where the first electrode is not formed.

26 Claims, 15 Drawing Sheets

F I G. 11A 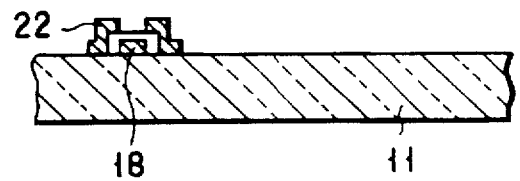
F I G. 11B 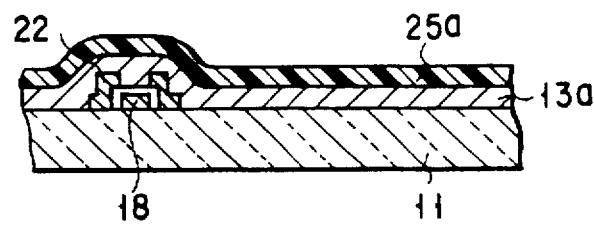
F I G. 11C 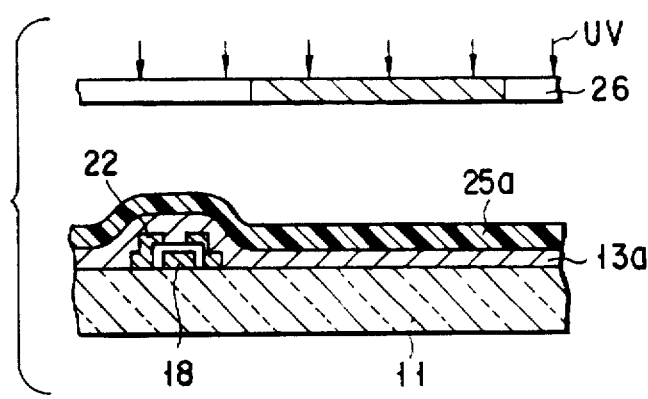
F I G. 11D 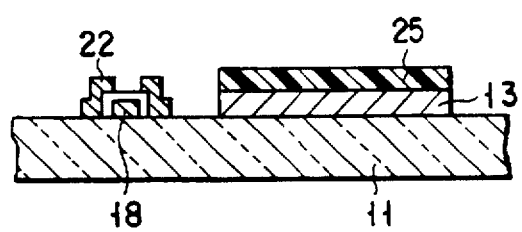
F I G. 11E 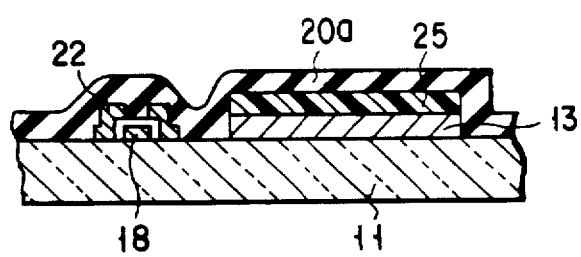
F I G. 11F 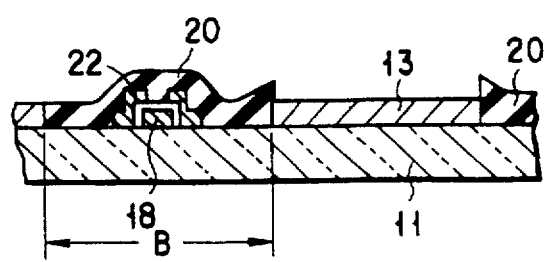

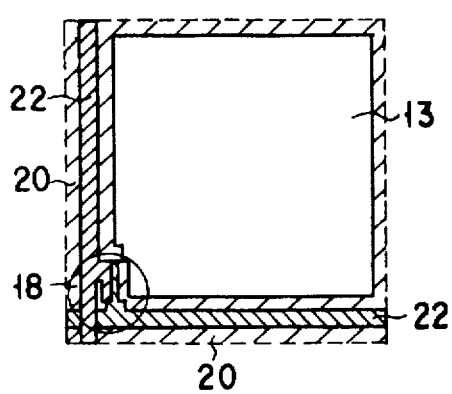
F I G. 19A
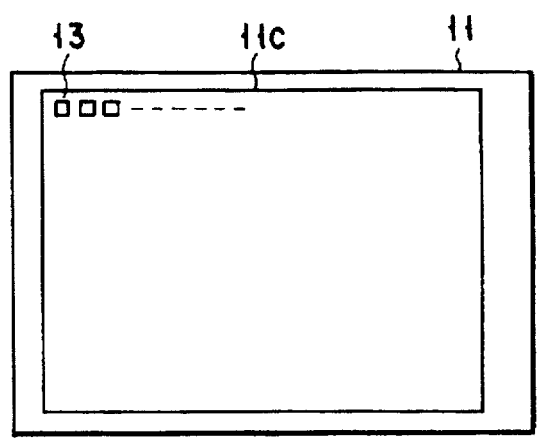
F I G. 19B
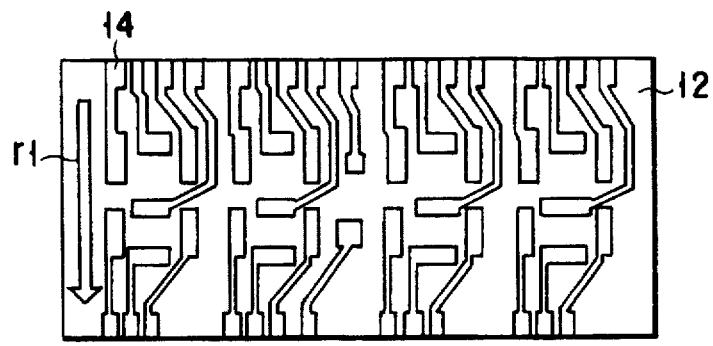
F I G. 20A
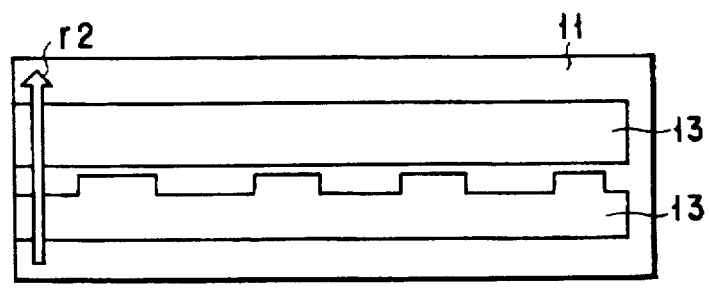
F I G. 20B
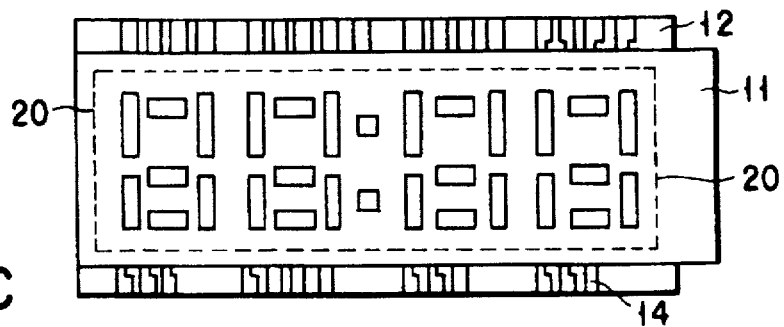
F I G. 20C

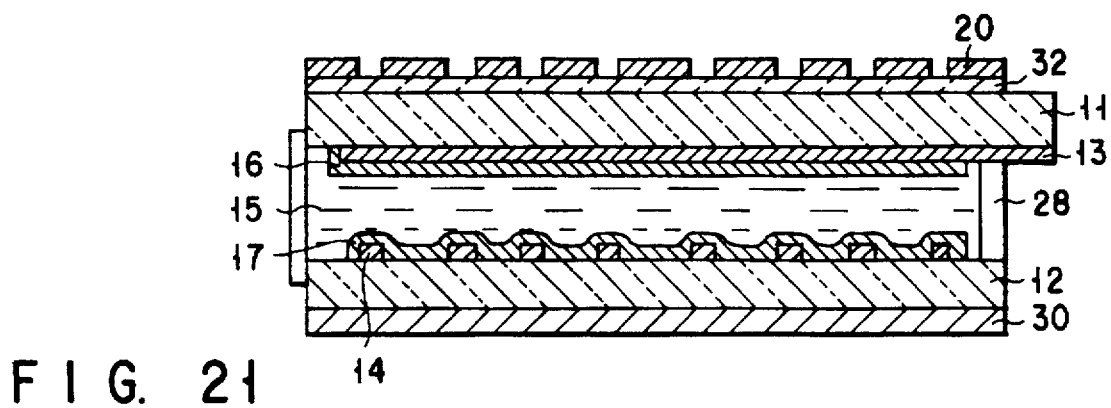
FIG. 21
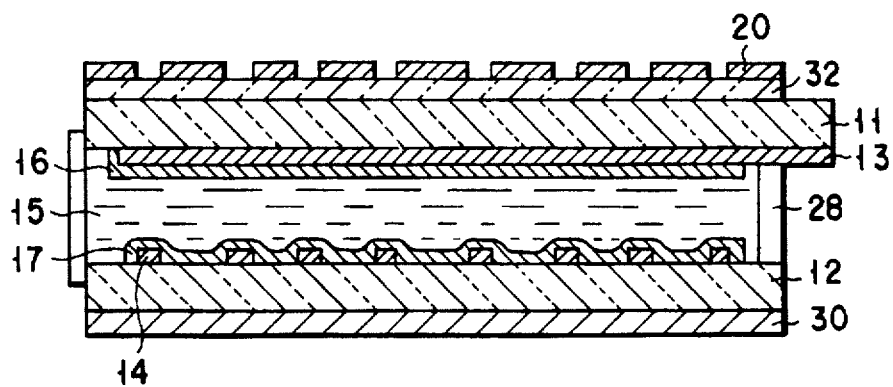
FIG. 22
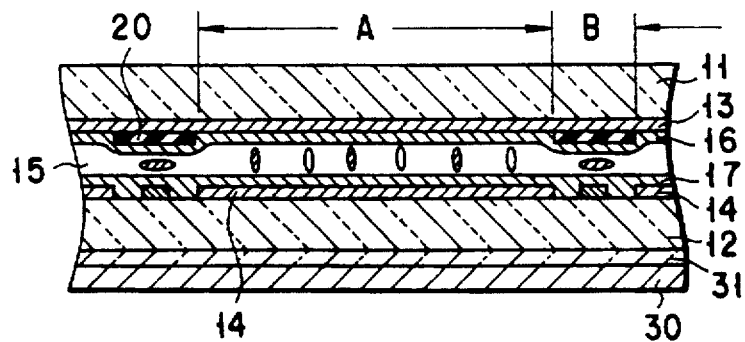
FIG. 23
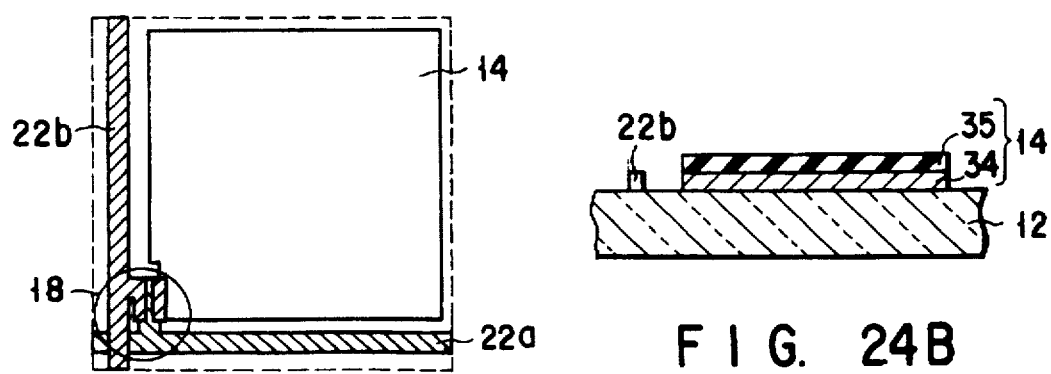
FIG. 24A
FIG. 24B

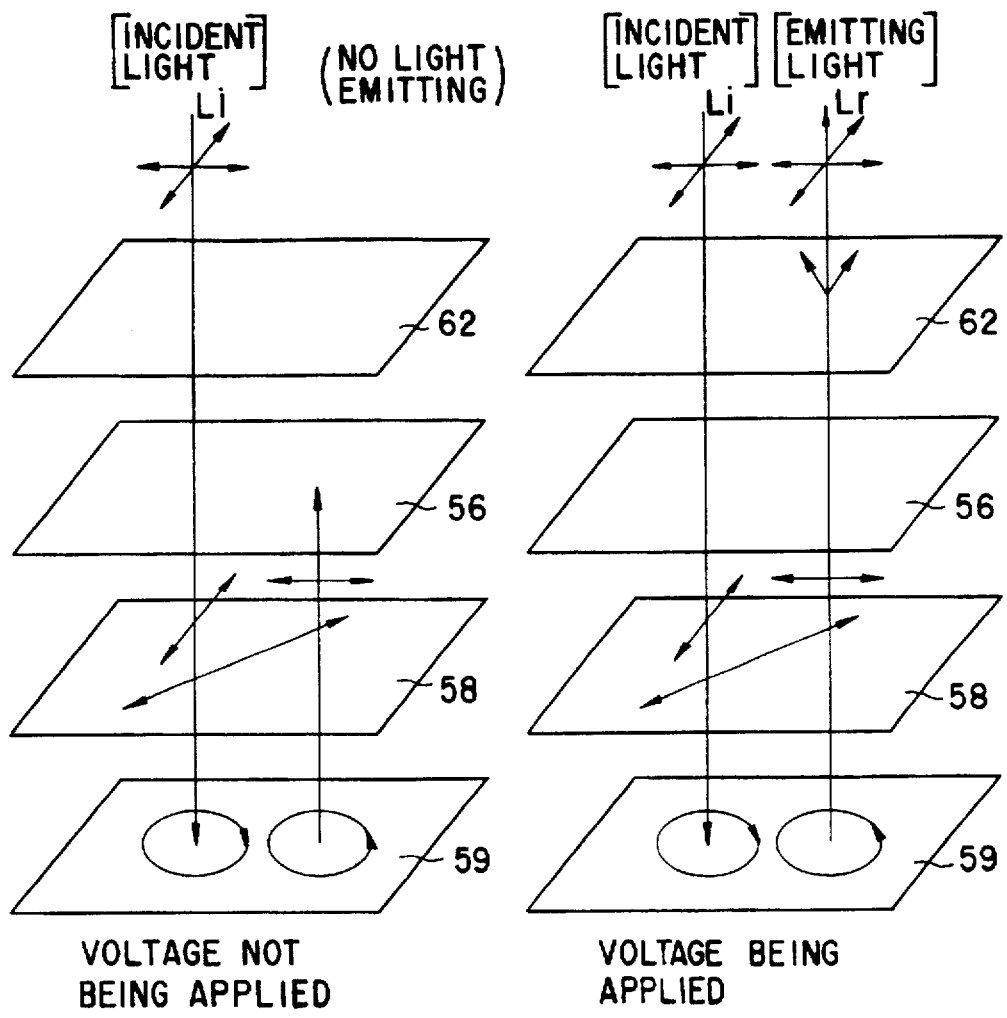
F I G. 27A  F I G. 27B
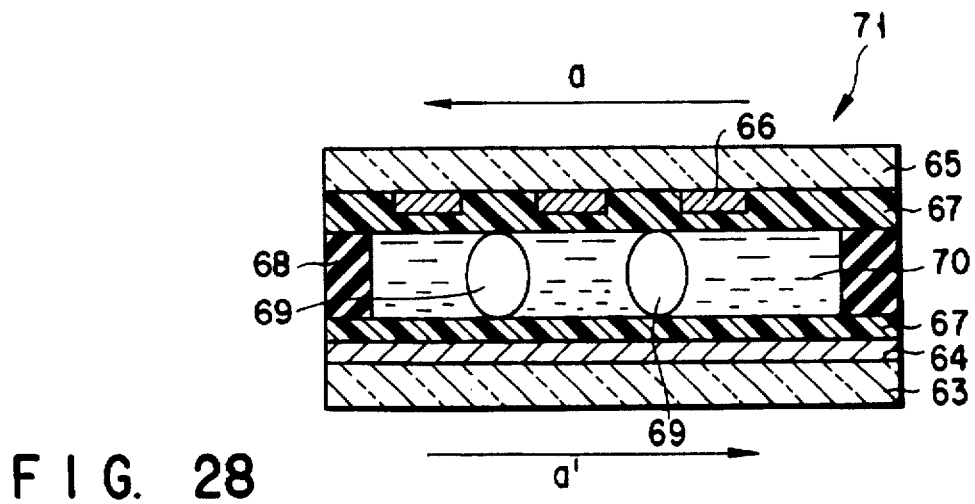
F I G. 28

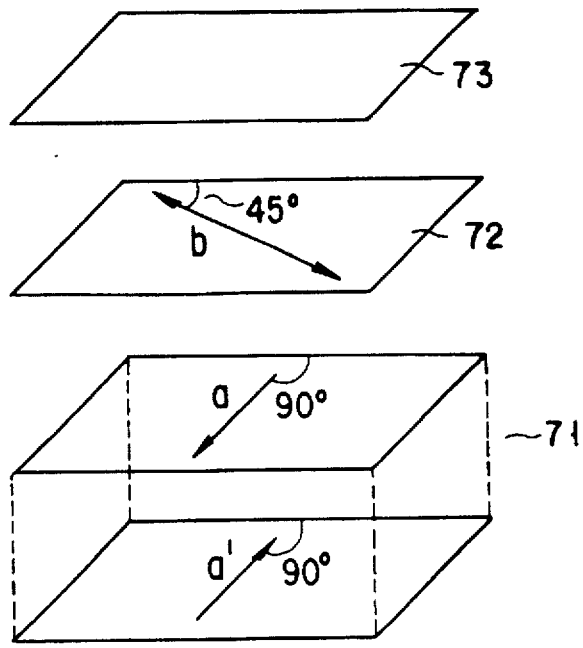
F I G. 29
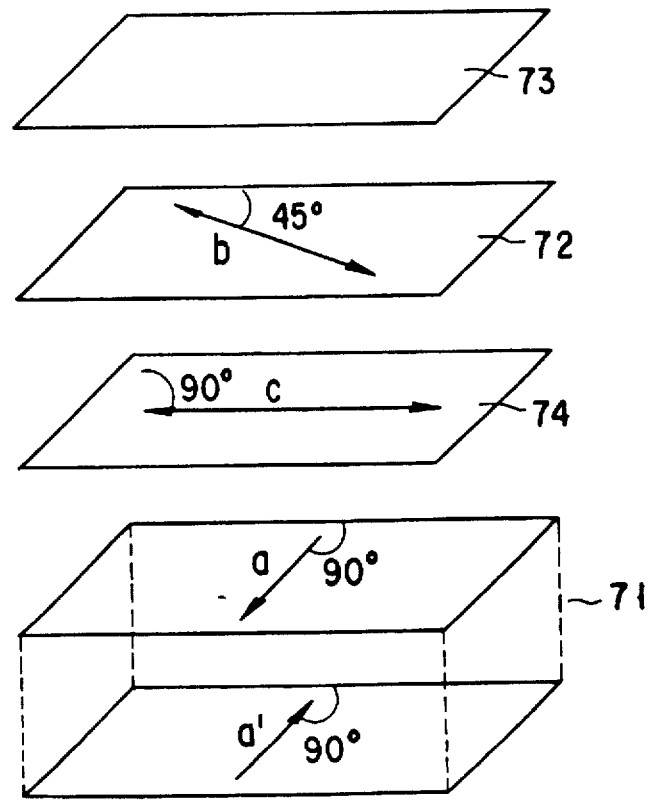
F I G. 30

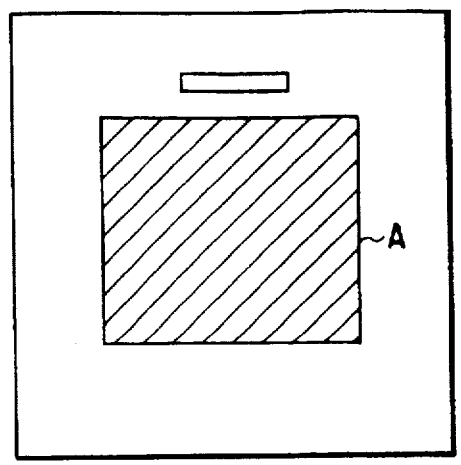
F I G. 31
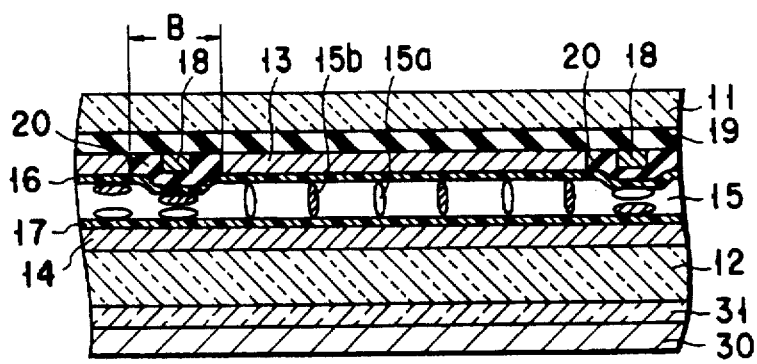
F I G. 32
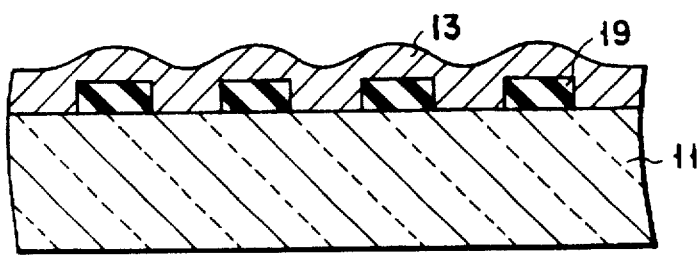
F I G. 33
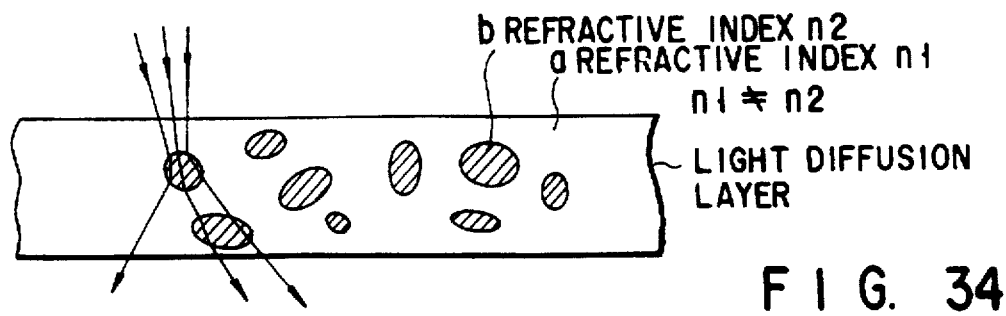
F I G. 34

REFLECTION TYPE LIQUID CRYSTAL DISPLAY DEVICE AND METHOD OF MANUFACTURING THE SAME

This is a division of application Ser. No. 08/544,077, filed Oct. 17, 1995.

BACKGROUND OF THE INVENTION

1. Field of the Invention

This invention relates to a reflection type liquid crystal display device and also to a method of manufacturing the reflection type liquid crystal display.

2. Description of the Related Art

A liquid crystal display device (hereinafter referred simply as LCD) is extensively utilized in a word processor, a personal computer, a projection type TV or a miniature TV.

Recently, a reflection type liquid crystal display device which requires no back-light has been attracting many attentions. Namely, since this reflection type liquid crystal display device can be used as a display device in office automation (OA) apparatuses without necessitating any back-light, it consumes a lesser amount of electric power, and therefore is suited for use in a portable equipment. However, since this reflection type liquid crystal display device makes use of the external light, it can not be satisfactorily used unless the reflectance of the LCD per se is not sufficiently high.

The reflection type liquid crystal display device can be classified according to the degree of reflectance thereof into three groups, i.e. a display mode where a couple of polarizing plate are used; a display mode where a single polarizing plate are used; and a display mode where no polarizing plate is used at all.

FIG. 1 shows a TN type LCD as an example of a display mode where a couple of polarizing plate are used. According to this TN type LCD, each of an upper plate 1 and a lower plate 2 are provided with a transparent electrode 3 and a transparent electrode 4 respectively, and a liquid crystal composition layer 5 is interposed between the upper plate 1 and the lower plate 2. On the outer surface of these substrate 1 and 2 is attached respectively with a polarizing plate 6a and 6b. Further, on the outer surface of the polarizing plate 6b attached to the lower substrate 2 is attached a diffusion reflecting plate 7. The optical path is formed in this TN type LCD such that light pass through the polarizing plate four times and the substrate four times. The light transmittance through the polarizing plate in a single pass is theoretically 50% or less, and actually a little more than 40%. Since the light would be absorbed by the other polarizing plate and the substrates, the reflectance may be ultimately greatly reduced.

FIG. 2 shows a single polarizing plate mode ECB type LCD having only one polarizing plate 6 as an example of a display mode where a single polarizing plate is used. In contrast to the TN type LCD, the optical path is formed in this ECB type LCD such that light passes through the polarizing plate only two times and the substrate only two times. In this FIG. 2 as well as in the following FIGS., the same portions with those of the previous FIGS. will be identified by the same reference numerals. The light transmittance through the polarizing plate is theoretically 50% or less in a single pass and actually a little more than 40% in this example as in the previous example. However, since the light absorption is reduced by an amount corresponding to two times through polarizing plate and two times through the substrate, the resultant light reflectance obtained would be a little higher than that in the case of the TN type LCD.

As examples of the display mode where no polarizing plate is used at all, a high polymer PC-GH type LCD having a guest-host liquid crystal composition layer 5a is shown in FIG. 3, a GH-HOMO type LCD having a guest-host liquid crystal composition layer 5b is shown in FIG. 4, and a double-layered GH-HOMO type LCD having two guest-host liquid crystal composition layers 5b with a common substrate 8 being interposed therebetween is shown in FIG. 5.

Since the polarizing plate is not employed at all in any of the systems shown in FIGS. 3 to 5, it is possible in these systems to brighten a display by an amount corresponding to one pass of light through the polarizing plate whose light transmittance is theoretically 50% or less and actually a little more than 40%. Moreover, if a reflecting plate is attached on the inner side of the cell as in the case of the single polarizing plate mode ECB type LCD mentioned above, it is possible to reduce the light absorption by an amount corresponding to two passes of light through the substrate, thus prominently improving the light reflectance as compared with a display mode employing the polarizing plate.

The reflection type LCD shown in FIG. 6 is a modification of the GH-HOMO type LCD shown in FIG. 4 and a quarter wavelength plate 9 is interposed between the reflecting plate 7 and the liquid crystal cell. In this reflection type LCD, an incident light passed through the liquid crystal cell then passes through the quarter wavelength plate 9 and is reflected by the reflecting plate 7, thus passing again through the quarter wavelength plate 9, the phase thereof being shifted by one half of its wavelength, and then interring again into the liquid crystal cell.

According to this reflection type LCD, it is possible with a structure having only one liquid crystal layer and one layer of liquid crystal cell to perform a light control in the same manner as in the double-layered GH-HOMO type LCD shown in FIG. 5.

According to these reflecting type LCDs, a display is generally effected by applying a voltage to a liquid crystal layer through electrodes, by passing electric current to a liquid crystal layer, or by applying a magnetic field. Further, since electrodes are employed in these reflecting type LCDs, an insulating region (a region where an electrode is not disposed) is certainly required. In particular, in the case of a display where various patterns such as characters, drawings or images are to be displayed, the electrodes are arranged in a matrix pattern. When electrodes are arranged in a matrix pattern, an interconnecting wiring is also generally required to be provided in addition to the electrodes provided for applying voltage to the liquid crystal layer. Even if electrodes are arranged not in a matrix pattern but other some complex patterns (for example, 7-segment display used in a miniature electric calculator or watch), an interconnecting wiring is also required. Thus, the LCD is formed of two regions, i.e. an electrode region provided for applying voltage to the liquid crystal layer and an insulation region, or three regions in some case, i.e. an electrode region provided for applying voltage to the liquid crystal layer, an insulation region and a wiring region.

In following description of this specification, a region of light reflecting layer whose liquid crystal can be modulated in response to the voltage from electrodes provided for applying voltage to the liquid crystal layer will be referred to as a modulation region, and a region other than this modulation region will be referred to as a non-modulation region. Likewise, an insulating region in the non-modulation region will be referred to as a space region, and a region where an interconnecting wiring is disposed in the non-modulation region will be referred to as a wiring region.

By the way, a light-shielding layer is often formed in the non-modulation region in a transmission type LCD. This light-shielding layer, when it is applied in a matrix display, is generally called a black matrix (BM). The provision of this light-shielding layer is intended to improve the contrast characteristic of display. Meanwhile, the mode of the LCD can be classified according to the system of controlling the display thereof (irrespective of whether it is a transmittance type or a reflecting type) into two groups, i.e. a normally-white mode (hereinafter referred to as NW mode) where a white state is obtained without being impressed with voltage, and a normally-black mode (hereinafter referred to as NB mode) where a white state is obtained only when a voltage is impressed.

In the case of NW mode, the non-modulation region is almost always kept in a white state irrespective of the condition of the modulation region. Therefore, when a light-shielding layer is not provided, the brightness of the black state as a whole (the modulation and non-modulation regions) is higher than when the shielding layer is provided. Accordingly, the contrast ratio (the brightness of the white state/the brightness of the black state) can be improved by providing a light-shielding layer. On the other hand, in the case of NB mode, the non-modulation region is almost always kept in a black state irrespective of the condition of the modulation region. Therefore, the brightness of the black state as a whole (the modulation and non-modulation regions) is darker as compared with the NW mode. However, the black state of the generally known NB mode is not sufficiently dark. Because of this, the shielding layer is provided thus rendering the brightness of the non-modulation region to zero to a full extent, thereby achieving a high contrast.

However, the provision of the light-shielding layer causes the lowering of the display brightness (luminosity) as a whole. This is a disadvantage of the light-shielding layer. However, in the case of the transmittance type LCD, a back light is utilized so that it is possible to maintain a sufficient degree of the display brightness (luminosity) by improving the brightness of this back light. Therefore, a light-shielding layer is frequently employed for attaining a sufficient degree of contrast.

By contrast, in the case of the reflecting type LCD, light that can be utilized is limited to the external light, so that it is impossible for the display side to control the incident light intensity. Accordingly, if the light-shielding layer is applied to a reflecting type LCD, the display brightness may be extremely lowered. Therefore, the light-shielding layer is not generally applied to the reflecting type LCD (however, since TFT acting as a driving element is influenced by light, a shielding layer is occasionally formed at a required portion of a non-modulation region). To begin with, the reflecting type LCD rely on the external light for its light source, and is incapable of controlling an incident light, so that the most important characteristic demanded is the luminosity (brightness). Because of this reason, there is no light-shielding layer on the non-modulation region of the conventional ordinary reflecting type LCD.

However, even if the light-shielding layer is omitted, the conventional reflecting type LCD still fails to achieve a sufficient degree of display brightness. In the case of NW mode, the non-modulation region is almost always kept in a white state, so that it is possible to attain some degree of display brightness as a whole. However, in the case of the reflecting LCD, since a polarizing plate or dye is employed for obtaining a black state, it can not actually avoid the light absorption to some extent even if it is in a white state. As a result, it is impossible to obtain a sufficient degree of brightness. On the other hand, in the case of NB mode, since the non-modulation region is almost always kept in a black state, the display brightness as a whole is naturally low.

As explained above, when the reflecting type liquid crystal display device is employed as a display, only low reflectance could be obtained even in the non-modulation region. In particular, this tendency is prominent in the case of normally-black mode, so that the display brightness as a whole is very low.

SUMMARY OF THE INVENTION

Therefore, an object of this invention is to provide a novel reflecting type liquid crystal display device which exhibits a high total reflectance irrespective of normally-black mode or normally-white mode.

Another object of this invention is to provide a method of forming such a reflecting type liquid crystal display device.

Namely, according to the present invention, there is provided a reflecting type liquid crystal display device comprising;

a first substrate provided on one surface thereof with a first electrode and disposed on an observation side;

a second substrate provided on one main surface thereof with a second electrode and disposed to face the first substrate in such a manner that the one main surface bearing the second electrode faces to the one main surface bearing the first electrode;

a liquid crystal composition layer interposed between the first substrate and the second substrate;

a modulation region which corresponds to the first electrode and is capable of modulating intensity of reflection of incident light in accordance with a response of the liquid crystal composition to a voltage applied to between the first substrate and the second substrate;

a non-modulation region occupying a region other than the modulation region;

a light diffusion layer formed on a main surface of the first substrate, which is opposite to the surface bearing the first electrode; and a first reflecting layer formed on at least a portion of the non-modulation region of the surface bearing the first electrode of the first substrate.

According to the present invention, there is further provided a reflecting type liquid crystal display device comprising;

a first substrate provided on one main surface thereof with a first electrode and disposed on an observation side;

a second substrate provided on one main surface thereof with a second electrode and disposed to face the first substrate in such a manner that the one main surface bearing the second electrode faces to the one main surface bearing the first electrode;

a liquid crystal composition layer interposed between the first substrate and the second substrate;

a modulation region which corresponds to the first electrode and is capable of modulating intensity of reflection of incident light in accordance with a response of the liquid crystal composition to a voltage applied to between the first substrate and the second substrate;

a non-modulation region occupying a region other than the modulation region;

a light diffusion layer formed on the surface bearing the first electrode of the first substrate; and a first reflecting layer formed on at least a portion of the non-modulation region of the light diffusion layer.

According to the present invention, there is further provided a reflecting type liquid crystal display device comprising;

a first substrate provided on one main surface thereof with a first electrode and disposed on an observation side;

a second substrate provided on one main surface thereof with a second electrode and disposed to face the first substrate in such a manner that the one main surface bearing the second electrode faces to the one main surface bearing the first electrode;

a liquid crystal composition layer interposed between the first substrate and the second substrate;

a modulation region which corresponds to the first electrode and is capable of modulating intensity of reflection of incident light in accordance with a response of the liquid crystal composition to a voltage applied to between the first substrate and the second substrate;

a non-modulation region occupying a region other than the modulation region;

a light diffusion layer consisting of a diffraction grating including a first transparent refractive index medium and a second transparent refractive index medium having a different refractive index from that of the first transparent refractive index medium and flatly arrayed, the light diffusion layer being formed on a main surface of the first substrate, which is opposite to the surface bearing the first electrode; and a mirror reflecting layer formed on any one of surfaces of the second substrate.

According to the present invention, there is further provided a reflecting type liquid crystal display device comprising;

a first substrate provided on one main surface thereof with a first electrode and disposed on an observation side;

a second substrate provided on one main surface thereof with a second electrode and disposed to face the first substrate in such a manner that the one main surface bearing the second electrode faces to the one main surface bearing the first electrode;

a liquid crystal composition layer interposed between the first substrate and the second substrate;

a modulation region which corresponds to the first electrode and is capable of modulating intensity of reflection of incident light in accordance with a response of the liquid crystal composition to a voltage applied to between the first substrate and the second substrate;

a non-modulation region occupying a region other than the modulation region; and a white reflecting layer formed on at least a portion of the non-modulation region of any one of main surfaces of the first substrate.

According to the present invention, there is further provided a reflecting type liquid crystal display device comprising;

a first substrate provided on one main surface thereof with a first electrode including a plurality of pixel electrodes arrayed in a matrix form and an interconnection interposed between these pixel electrodes, the first substrate being disposed on an observation side;

a second substrate provided on one main surface thereof with a second electrode and disposed to face the first substrate in such a manner that the one main surface bearing the second electrode faces to the one main surface bearing the first electrode;

a liquid crystal composition layer interposed between the first substrate and the second substrate; and a white reflecting layer formed on a region of the one main surface of the first substrate where the first electrode is not formed.

According to the present invention, there is further provided a method of manufacturing a reflecting type liquid crystal display display device comprising the steps of;

forming a transparent conductive layer on one main surface of a first substrate;

forming a resist pattern on the transparent conductive layer;

forming an electrode pattern including a transparent conductive layer by etching the transparent conductive layer with the resist pattern being used as a mask;

forming a white layer on a main surface of the first substrate on which the electrode pattern and resist pattern are disposed; and forming a white reflecting layer on a region other than where the electrode pattern is formed by removing the resist pattern together with the white layer formed over the resist pattern.

According to the present invention, there is further provided a method of manufacturing a reflecting type liquid crystal display device comprising the steps of;

forming a colored layer on one main surface of a first substrate;

forming a resist pattern on the transparent conductive layer;

forming a color filter pattern by etching the colored layer with the resist pattern being used as a mask;

forming a white layer on a surface of the first substrate on which the color filter pattern and resist pattern are disposed; and forming a white reflecting layer on a region other than where the colored layer is formed by removing the resist pattern together with the white layer formed on the resist pattern.

According to the present invention, there is further provided a reflecting type liquid crystal display device comprising;

a liquid crystal cell including a first substrate provided on one main surface thereof with a first electrode and disposed on an observation side; a second substrate provided on one main surface thereof with a second electrode and disposed to face the first substrate in such a manner that the one main surface bearing the second electrode faces to the one main surface bearing the first electrode; and a liquid crystal composition layer comprising a nematic liquid crystal containing a black dye and exhibiting a dielectric anisotropy, the liquid crystal composition layer being interposed between the first substrate and the second substrate;

a light diffusion plate provided on a main surface thereof with a reflection-preventive film and disposed on an observation side of the liquid crystal cell;

a mirror reflecting member disposed at a side of the liquid crystal composition layer which is opposite to the observation side; and a quarter wavelength phase-shifting plate disposed between the liquid crystal composition layer and the mirror reflecting member for shifting a phase of light passing therethrough by a quarter of wavelength.

According to the present invention, there is further provided a reflecting type liquid crystal display device comprising;

a liquid crystal cell including a first substrate provided on one main surface thereof with a first electrode and disposed on an observation side; a second substrate provided on one main surface thereof with a second electrode and disposed to face the first substrate in such a manner that the one main surface bearing the second electrode faces to the one main surface bearing the first electrode; and a liquid crystal composition layer containing a nematic liquid crystal exhibiting a dielectric anisotropy, the liquid crystal composition layer being interposed between the first substrate and the second substrate;

a light diffusion plate provided on a main surface thereof with a reflection-preventive film and disposed on an observation side of the liquid crystal cell;

a polarization plate interposed between the liquid crystal composition layer and the light diffusion plate;

a mirror reflecting member disposed at a side of the liquid crystal composition layer which is opposite to the observation side; and a phase-shifting plate disposed between the liquid crystal composition layer and the polarization plate or between the liquid crystal composition layer and the mirror reflecting member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 11A to 11F show respectively a cross-sectional view illustrating the steps of manufacturing a liquid crystal display device of this invention;

FIGS. 19A and 19B respectively show a plan view illustrating the structure of a substrate according to Example 3 of this invention;

FIGS. 20A to 20C respectively show a plan view illustrating the structure of a substrate according to Example 6 of this invention;

FIG. 21 is a cross-sectional view schematically showing a liquid crystal display device according to Example 6 of this invention;

FIG. 22 is a cross-sectional view schematically showing a liquid crystal display device according to Example 7 of this invention;

FIG. 23 is a cross-sectional view schematically showing a liquid crystal display device according to Example 8 of this invention;

FIGS. 24A and 24B respectively show a plan view and cross-sectional view, each illustrating the structure of electrodes of a substrate according to Example 9 of this invention;

FIGS. 27A and 27B respectively show a perspective view, each illustrating the movement of a liquid crystal display device according to Example 11 of this invention;

FIG. 28 is a cross-sectional view schematically showing a liquid crystal cell to be employed in Examples 12 to 14 of this invention;

FIG. 29 is a perspective view schematically illustrating the structure of a liquid crystal display device according to Example 12 of this invention;

FIG. 30 is a perspective view schematically illustrating the structure of a liquid crystal display device according to Examples 13 and 14 of this invention;

FIG. 31 is a plan view illustrating a shape of pattern of $SiO_x$ layer of a liquid crystal display device according to Example 15;

FIG. 32 is a cross-sectional view schematically showing a liquid crystal display device according to Example 15 of this invention;

FIG. 33 is a cross-sectional view of a light diffusion layer constituting a diffraction grating wherein an $SiO_x$ layer and an ITO layer in the liquid crystal display device according to Example 15 are two-dimensionally distributed;

FIG. 34 is a cross-sectional view of a light diffusion layer comprising two kinds of refractive index medium which are three-dimensionally arranged;

DETAILED DESCRIPTION OF THE PREFERRED EMBODIMENTS

Figure 1:
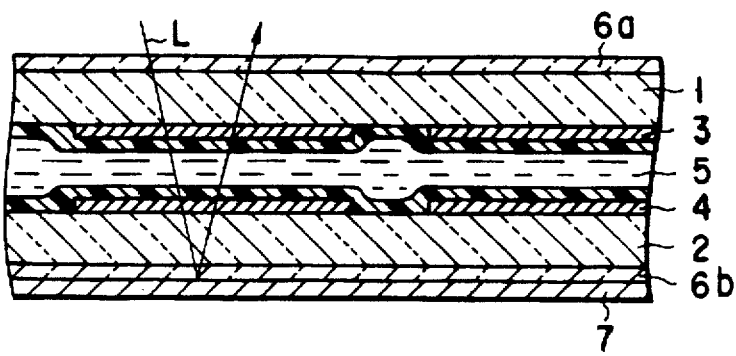
FIG. 1 is a cross-sectional view illustrating the conventional reflecting type TN-LCD provided with a couple of polarizing plates.
Figure 2:
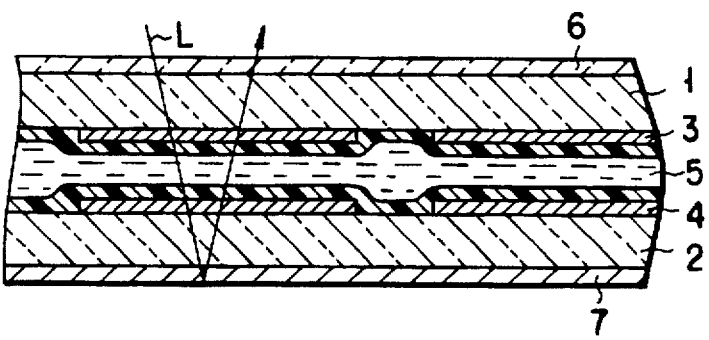
FIG. 2 is a cross-sectional view illustrating the conventional reflecting type ECB-LCD provided with one sheet of polarizing plate.

The function and effects of the liquid crystal display device according to this invention will be further explained with reference to the drawings. In these drawings, the same portions will be identified by the same reference numerals.

The liquid crystal display device according to a first embodiment of this invention is mainly characterized in that a white reflecting layer is formed at a portion or the entire portion of the non-modulation region.

The specific embodiments of the first embodiments of this invention are as follows.

(1) A reflecting type liquid crystal display device wherein the white reflecting layer is mounted on the surface of the first substrate where the first electrode is formed.

(2) A reflecting type liquid crystal display device wherein the white reflecting layer is formed of a resist material having a white pigment dispersed therein.

(3) A reflecting type liquid crystal display device according to item (2) wherein said white pigment comprises as a main component $TiO_2$.

(4) A reflecting type liquid crystal display device wherein at least one of the first or the second substrate is provided with a color filter, and the white reflecting layer is formed on a surface of the substrate where said electrode is formed and at a portion of the surface where the color filter is not formed.

(5) A reflecting type liquid crystal display device wherein said liquid crystal composition contains a dichroic dye.

(6) A reflecting type liquid display device wherein the liquid crystal composition is a nematic liquid crystal containing a black dye and exhibiting a positive dielectric anisotropy, molecules thereof being homogeneously oriented between the first and the second substrates, and a quarter wavelength plate and a second reflecting plate are mounted on the second substrate.

(7) A reflecting type liquid crystal display device wherein the white reflecting layer functions as an intersubstrate spacer for controlling the space between the first and the second substrates.

The construction, operation and manufacturing process of the reflecting type liquid crystal display device according to the first embodiment of the present invention will be described.

Figure 7:
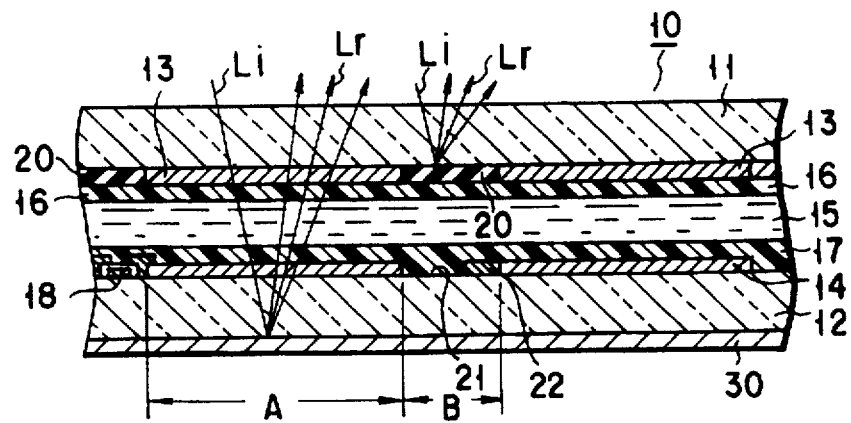
FIG. 7 is a cross-sectional view illustrating one example of liquid crystal display device according to this invention.

FIG. 7 shows the structure of a liquid crystal cell provided with the white reflecting layer formed at a portion or the entire portion of the non-modulation region. Namely, an upper substrate 11 disposed on the observation side is provided on its inner surface with a white reflecting layer 20 and a stripe-shaped transparent electrode 13. Whereas, a lower substrate constituting a counter substrate provided on its upper surface with a many number of arrays of pixel electrode 14 provided with an MIM switching element 18. Alignment films 16 and 17 are formed respectively on the surfaces of the substrates 11 and 12 where the electrode is provided. Further, a liquid crystal layer 15 is interposed between these substrates 11 and 12. On the outer surface of the lower substrate 12 is adhered a diffusion-reflecting plate 30 thereby forming a reflecting type liquid crystal display device 10.

The electrode region is a region where a reflecting light intensity can be modulated as a result of the response by the liquid crystal to a voltage impressed, thus constituting a modulation region A. The region other than this modulation region A is a region which is incapable of controlling the light intensity, thus constituting a non-modulation region B. This non-modulation region B is occupied by a space region 21 corresponding to a space between the electrodes and by a wiring region 22 for actuating the electrode 13. The white reflecting layer 20 is disposed over the non-modulation region B, i.e. at a space between the stripe-shaped electrodes 13 on the inner surface of the upper substrate.

The white reflecting layer 20 may be made of a white pigment consisting mainly of MgO for example, and should preferably have a reflection property of giving substantially a uniform diffuse reflection. By the "uniform diffuse reflection", it is meant that irrespective of the incidence angle of incident light Li, the reflected light Lr can be uniformly reflected in various angles, so that it is possible, irrespective of the environment (differences in distance according to the difference in direction of incident light), to obtain a high brightness in any angles. Namely, by the provision of the white reflecting layer at a portion or the entire portion of the non-modulation region of a liquid crystal cell according to this invention, it is made possible to obtain a higher reflectance of the non-modulation region as compared with that of the non-modulation region (with or without a light-shielding layer (a region occupied by a wiring or a liquid crystal layer)) of the conventional reflecting type LCD.

As mentioned above, the most important characteristic demanded for a reflecting type LCD is the luminosity, i.e. reflectance. In the case of a transmittance type LCD, the measures of forming a light-shielding layer on a non-modulation region have been conventionally taken for improving the contrast ratio. In the case of a reflecting type LCD, however, any measures of improving the luminosity or reflectance of a non-modulation region have never been tried. For this reason, the reflectance of a modulation region and non-modulation region as a whole has been left low.

By contrast, according to the reflecting type LCD of this invention, a white reflecting layer having an extremely high reflectance is formed on the non-modulation region so that it is possible to always attain a high reflectance at the non-modulation region irrespective of the state of the modulation region. Therefore, the entire reflectance of the display can be prominently improved as compared with the display where nothing of such a white reflecting layer is provided.

Figure 8:
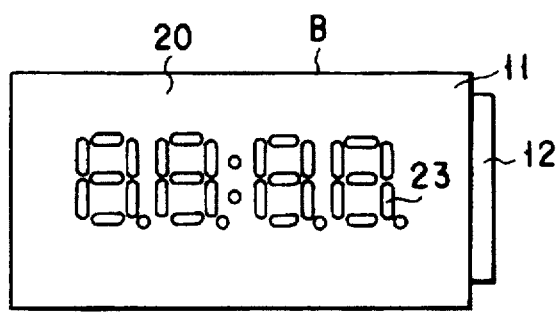
FIG. 8 is a plan view illustrating another example of liquid crystal display device according to this invention.

This excellent effect can be achieved if this white reflecting layer is formed in a suitable thickness and an arrangement that allow a higher reflectance of the non-modulation region as compared with that of the non-modulation region of the conventional reflecting type LCD. For example, when this white reflecting layer is to be applied to a character display consisting of 7 segments 23 having a relatively large display pattern as shown in FIG. 8, the white reflecting layer 20 may be formed over the non-modulation region B on the outer surface of a substrate 11 of observation side in such a thickness that enables a fully uniform diffuse reflection to be obtained. However, if the display pattern is a very fine pattern as compared with the thickness of the substrate 11, it may be preferable to dispose the white reflecting layer 20 on the inner surface of the substrate as shown in FIG. 7 in order to prevent parallax resulting from the thickness of the substrate.

As mentioned above, the excellent effect of this invention can be achieved as long as this white reflecting layer is formed in a suitable thickness and an arrangement that allow a higher reflectance of the non-modulation region as compared with that of the non-modulation region of the conventional reflecting type LCD. Accordingly, there is no need for the thickness liquid crystal layer (a space between substrates). However, if the white reflecting layer is to be formed on one of the substrates in the step of forming the substrates, the white reflecting layer should preferably be formed on the inner surface of the substrate of observation side in order to avoid the light absorption by the liquid crystal layer. In particular, the effect to be achieved by such a structure as described above would be prominent in the case of a dye-addition reflecting type LCD having a liquid crystal layer which is high in light absorbency. This effect is particularly prominent in the dye-addition reflecting type LCD of NB mode where the black state is maintained when voltage is not impressed, since the light absorption at the liquid crystal layer thereof is extremely high.

Figure 9:
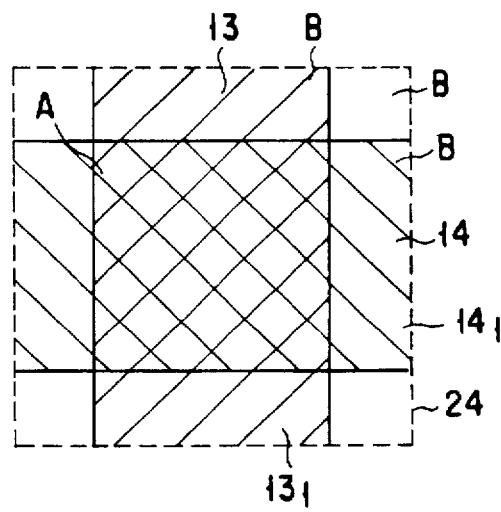
FIG. 9 is a plan view schematically illustrating the modulation region and non-modulation region of a liquid crystal display device of this invention.

When this invention is applied to a matrix type LCD, an interconnecting wiring is inevitably mounted on the non-modulation region. In this specification, by the term of "interconnecting wiring (or wiring)", it is intended to mean a conductive member mounted for electrically connecting the external electric source to the electrodes of the modulation region in order to apply a voltage to the modulation region. For example, in the case of electrodes of simple matrix structure as shown in FIG. 9, the interconnecting wiring (or wiring) means conductor regions 131 and 141 excluding the intersected portion of an upper electrode 13 and a lower electrode 14 among the entire electrode pattern within the region 24 constituting one pixel.

Figure 10:
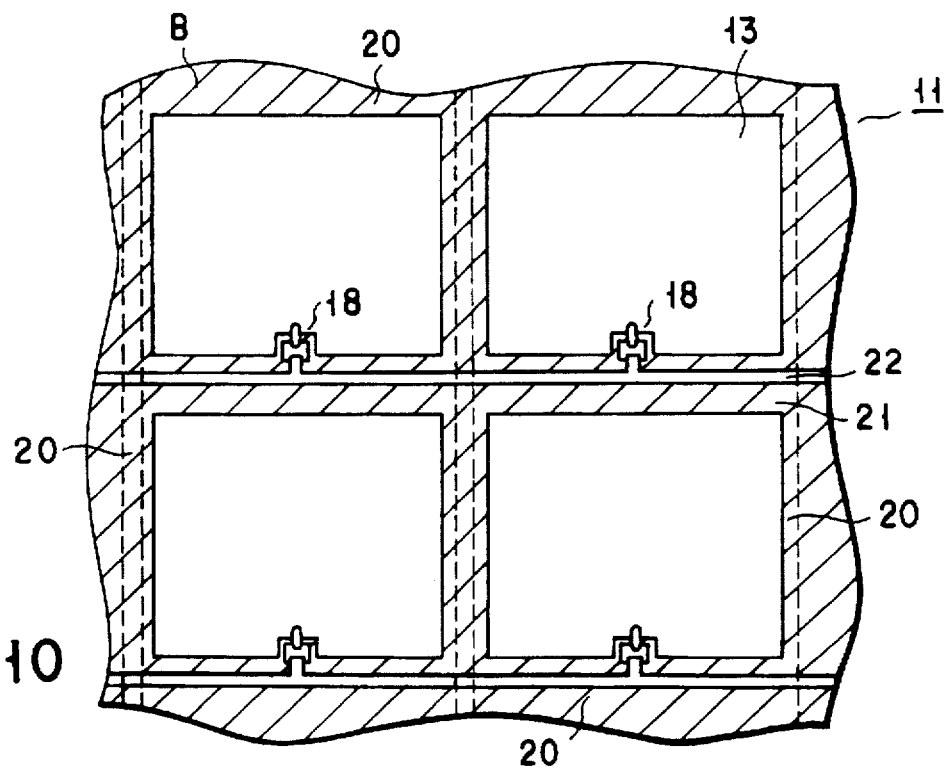
FIG. 10 is a plan view illustrating another example of liquid crystal display device according to this invention.
Figure 12:
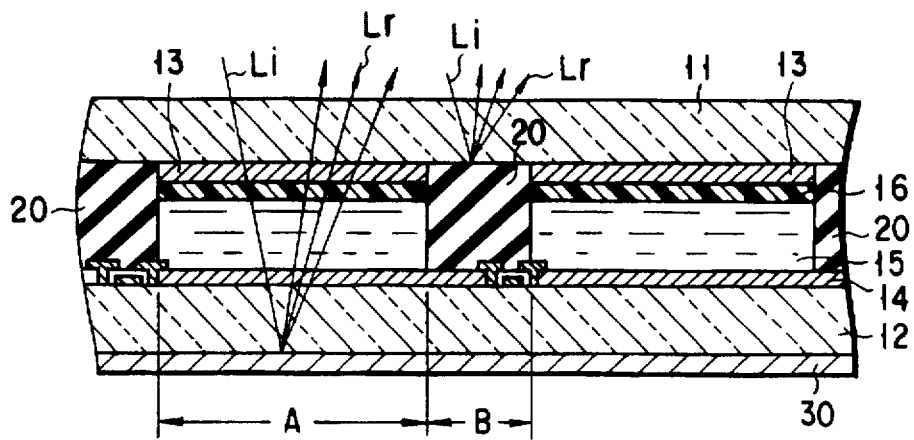
FIG. 12 is a cross-sectional view illustrating another example of liquid crystal display device according to this invention.

In order to improve the entire reflectance as much as possible, the white reflecting layer may be formed, in plane-wise, on the entire area of the non-modulation region within the display area. However, in the case of a matrix substrate 11 attached with an MIM device 18 as shown in FIG. 10, a light-shielding conductive material (such as Al) is employed as a wiring 22. Accordingly, when a light-shielding conductive material is employed as a wiring, and at the same time, it is desired to form the white reflecting layer 20 in such a manner as to fully achieve its function all over the entire region of the non-modulation region B within the display region, the white reflecting layer 20 may be required to be entirely formed including the underneath of the wiring.

In order to form the wiring layer 22 below the wiring layer 22 however, the wiring layer 22 may be required to be formed over the white reflecting layer 20, so that the material of the white reflecting layer 20 is required to withstand the process of forming a wiring pattern. Therefore, in the actual manufacture of the matrix type LCD, the white reflecting layer 20 is formed only on a region excluding the wiring region 22, i.e. only the space region 21 in the non-modulation region B (a region excluding the pixel electrode 13) of the display area as shown in FIG. 10, hence the material for the white reflecting layer 20 may not be required to be capable of withstanding the process of forming a wiring pattern.

Any materials can be used as the white reflecting layer of this invention as far as they are capable of obtaining a strong diffuse reflection. Examples of the material which is capable of obtaining a strong diffuse reflection are alumina (aluminum oxide) and MgO (magnesium oxide). If a resist material having a white pigment dispersed therein is employed as a material for the white reflecting layer, the white reflecting layer may be formed by merely subjecting the resist material to a light exposure and then to a development in the pattern-forming step of the white reflecting layer. Therefore, with the employment of such a resist material, it is possible to simplify the manufacturing process as compared with a process wherein a separate resist material is employed for performing a light exposure, a development and an etching. $TiO_2$ may be employed as a suitable material for this white pigment in view of its excellent dispersibility in a resist material.

When this invention is to be applied to a color reflecting type LCD using a color filter, color layers substantially corresponding to the modulation region are formed and the white reflecting layer is formed on a region other than the regions of the color layers. With this structure, it is possible to bury or level step portions formed on the surface by the thickness of the color layers with the white reflecting layer. Further, when the white reflecting layer is to be formed with a resist material having a white pigment dispersed therein, the color layers are utilized as a photomask, and an exposure from back surface may be performed for carrying out the patterning. When the white reflecting layer is formed on a region other than the regions of the color layers, it is possible not only to improve the reflectance of the entire regions, but also to prevent the staining of the non-modulation region.

The effect to be obtained according to this first embodiment of this invention would be prominently recognized when this first embodiment is applied to the reflecting type LCD of various types. In particular, when this first embodiment is applied to a system where a dye is added to a liquid crystal layer (a system which is generally known as a guest-host (GH) type LCD, because of the addition of a dye to a liquid crystal material), the more prominent effect would be obtained. Because, in the system having a liquid crystal layer added with a dye, the liquid crystal layer becomes more light-absorptive in proportion to the amount of the dye added.

Figure 3:
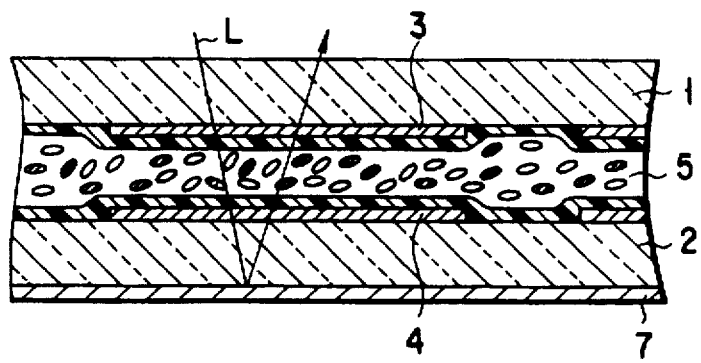
FIG. 3 is a cross-sectional view illustrating the conventional reflecting type GH-PC-LCD.
Figure 4:
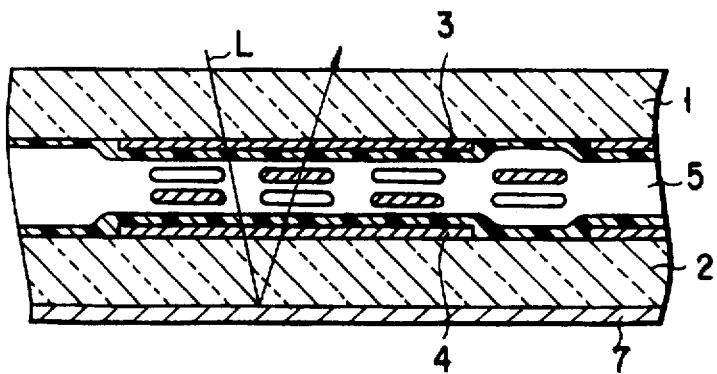
FIG. 4 is a cross-sectional view illustrating the conventional reflecting type GH-HOMO-LCD.
Figure 5:
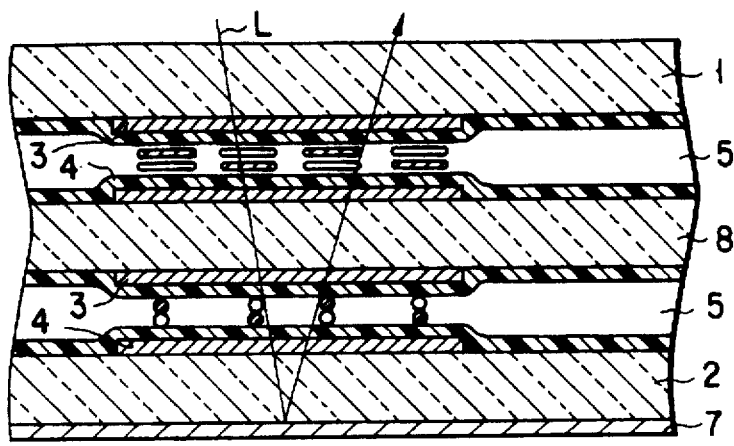
FIG. 5 is a cross-sectional view illustrating the conventional 2-layered reflecting type GH-HOMO-LCD.
Figure 6:
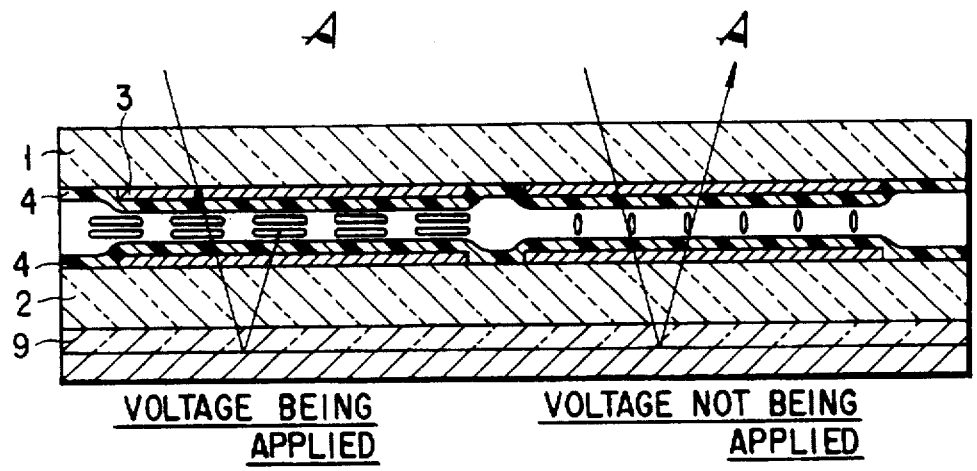
FIG. 6 is a cross-sectional view illustrating the conventional a reflecting type GH-HOMO-LCD provided with a quarter wavelength plate.

According to the conventional GH type LCD shown in FIG. 3 or FIG. 4, it is possible with only a single layer of liquid crystal (only one cell) to obtain a high contrast ratio and a high reflectance in the modulation region because the LCD is so constructed as to function with only a single layer of liquid crystal. Therefore, if a black dye is employed as a dye, and at the same time, a quarter wavelength plate which is capable of shifting the phase by a quarter of each wavelength of the whole range of visible radiation (this quarter wavelength plate may be prepared by laminating an oriented film consisting of two different kinds of material in such a manner as to shift the optical axis thereof, and combining the wavelength-dependency of each phase difference so that a phase difference of a quarter of wavelength can be obtained to every wavelength) is employed, it is possible to obtain an extremely high contrast ratio and reflectance at the modulation region.

In the case of this display mode, the non-modulation region is always kept in a black state irrespective of the state of the modulation region, that is, an NB mode. Therefore, if a white reflecting layer is formed on the non-modulation region as proposed by this invention, the entire reflectance can be prominently improved.

The construction shown in FIG. 10 is formed in such a way that an MIM device-attached dot matrix substrate is employed as an observation side substrate 11, and the white reflecting layer 20 is formed on a region excluding the wiring region and the modulation region, that is, on all over the space region 21. The substrate 11 attached with this white reflecting layer 20 can be prepared by the process shown in FIGS. 11A to 11F.

Step (I): An MIM device 18 and a wiring 22 are formed on a surface of the observation side substrate 11 (FIG. 11A).

Step (II): An indium tin oxide (ITO) film 13a is formed a surface of the substrate by means of a sputtering method. Then, a resist film 25a is formed through coating on this ITO film 13a (FIG. 11B).

Step (III): The resist film 25a is exposed to an ultraviolet beam through a mask pattern 26, and then developed leaving only the resist film 23 over the ITO film, the resist film 23 being turned into a pixel electrode 13 in a subsequent step (FIG. 11C).

Step (IV): The ITO film 13a is etched with the resist film 23 being used as a mask thereby forming an electrode pattern consisting solely of a pixel electrode portion (FIG. 11D).

Step (V): A resist film 20a mixed therein with $TiO_2$ is formed through coating on the entire surface of the substrate (FIG. 11E).

Step (VI): The resist film 23 on the pixel electrode 13 is removed and at the same time, the resist film 20a mixed therein with $TiO_2$, which has been coated on the pixel electrode, is removed. As a result, the white reflecting layer 20 is formed on a region excluding those over the pixel electrode region, i.e. on the non-modulation region B (FIG. 11F).

As explained above, the formation of the wiring 22 or the pattern of the pixel electrode 13 is performed by way of photolithography, and the resist employed is positive type (a resist which can be removed in a development step for removing only the region irradiated by an ultraviolet beam). The features of the process shown in FIGS. 11A to 11F reside in that the resist employed in the step of forming patterns of wiring and the modulation region is not removed, and a material for the white reflecting layer is coated over the resist, and in that the resist used in the step of forming patterns of wiring and the modulation region is removed so that only a portion of the white reflecting layer which is disposed over the resist used in the step of forming patterns of wiring and the modulation region is removed together with the resist thereby forming a pattern of the white reflecting layer on a region excluding the wiring region and the modulation region.

The method of forming a pattern in such a manner that a film is formed over a resist which has been employed in the formation of previous process of forming a pattern without removing the resist, and then the resist is removed together with a portion of the film disposed over the resist thereby forming a pattern of the film is generally called a lift-off method. If this lift-off method is employed for the formation of the white reflecting layer in the preparation of the liquid crystal display device according to the first embodiment of this invention, the steps of development and exposure for forming a pattern of the white reflecting layer may be omitted, thus saving the manufacturing cost. Moreover, it is possible to obtain a sufficient degree of alignment accuracy between the pattern of the white reflecting layer and the modulation region or the wiring region. This is because the development as well as the exposure are not performed separately for the formation of these patterns. This lift-off method can be effectively utilized for the formation of a pattern of the white reflecting layer all over the region excluding the modulation region, or for the formation of a pattern in a region excluding the region of color layer of the color filter, as long as the modulation region or the color layer of the color filter is to be performed by way of the photolithography using a positive resist.

If the white reflecting layer 20 is formed on the inner side of the cell and the film thickness of the white reflecting layer 20 is made identical to the film thickness of the liquid crystal composition 15, the white reflecting layer 20 can be utilized to function as a spacing material between the substrates. If the white reflecting layer 20 can be utilized in this manner, it is possible to simplify the process as compared with a process wherein a particulate spacer is dispersed throughout the substrate, and at the same time to prevent any bad influence from being given to the modulation region.

In the above description, the effects to be obtained by the first embodiment of this invention has been explained with reference one example of its structure. However, the effect and function of this first embodiment is not limited to this one example, but may be obtained likewise as long as the structure, materials and process are selected within the features of the first embodiment of this invention. For example, the same effect and function as those described in the above example may be obtained even if a dot matrix substrate provided with a TFT device is employed as a substrate. Further, even if the white reflecting layer is stained more or less, a prescribed effect can be apparently obtained according to this invention as long as the reflectance in the white state of the modulation region is higher in reflectance than the non-modulation region of the prior technique. The first embodiment of this invention can be applied to various types of the liquid crystal display device which have been explained as the typical conventional technique.

Next, a liquid crystal display apparatus according to a second and a third embodiments of this invention will be explained as follows.

As explained above, it is possible to improve the reflectance and the contrast ratio of a liquid crystal display device by mounting a white reflection layer, i.e. a diffuse reflection layer on the non-modulation region. However, in the second and third embodiments, this diffuse reflection layer is separated into a light diffusion layer and a reflection layer. With this structure, the contrast ratio can be further improved, and therefore the visibility can be improved.

According to the second embodiment, a light diffuse layer is formed on the observation side (a first) substrate and a mirror reflection layer is formed on the counter (a second) substrate, whereas according to the third embodiment, a light diffuse layer and a mirror reflection layer is formed on the observation side (a first) substrate.

In the GH type liquid crystal display device according to the second embodiment of this invention, the liquid crystal composition is formed of a nematic liquid crystal containing dichroic black dye and having a dielectric anisotropy. The molecule of this nematic liquid crystal functions, when a black state is desired to be effected, as an analyser which is adapted to absorb a light which has been turned into a linearly polarized light by passing through a quarter wavelength phase-shifting plate after being reflected from a reflecting layer or a reflecting plate, so that a display of high contrast can be obtained. Further, since a light diffusion plate is disposed on the observation side of the liquid crystal cell, and at the same time since a mirror reflecting layer or a reflecting plate which is free from light scattering is disposed backward as viewed from the observation side, it is possible to extremely minimize the uptaking of background into the display image.

Further, when only one polarizing plate is disposed between a liquid crystal layer and a light diffusion plate, it is possible to improve the utilization efficiency of light and to obtain much luminous display image as compared with the conventional liquid crystal display device employing a couple of polarizing plates. Moreover, since a mirror reflecting layer or a reflecting plate which is free from light scattering is employed as a reflecting plate, it is possible to inhibit the scattering of polarized light within a liquid crystal cell and to realize a display image of high contrast. Further, since a light diffusion plate is disposed on the observation side of the liquid crystal cell, it is possible to extremely minimize the uptaking of background into the display image, whereby making it possible to obtain a display image free from viewing angle dependency.

Moreover, when a phase-shifting plate is interposed between a polarizing plate and a liquid crystal layer (a liquid crystal cell), or between a liquid crystal layer and a mirror reflecting layer, it is possible to realize an excellent black-and-white display by suitably combining the retardation value of the phase-shifting plate with that of the liquid crystal cell.

The specific embodiments of these second and third embodiments of this invention are as follows.

(1) A reflecting type liquid crystal display device which further comprises a second reflecting layer formed any one of the surfaces (main surfaces) of the second substrate.

(2) A reflecting type liquid crystal display device according to the above item (1), wherein the second reflecting layer is formed at least partially on the surface of the second substrate where a second electrode is formed.

(3) A reflecting type liquid crystal display device according to the above item (2), wherein the second reflecting layer is used also as a second electrode.

(4) A reflecting type liquid crystal display device according to the above item (1), wherein the second reflecting layer is formed on the second electrode.

(5) A reflecting type liquid crystal display device according to the above item (1), wherein the second reflecting layer is formed at least partially on a surface of the second electrode which is opposite to the surface where the second electrode is formed.

(6) A reflecting type liquid crystal display device according to the above item (1), wherein the second reflecting layer comprises as a main component Al or Ag.

(7) A reflecting type liquid crystal display device which comprised a color filter formed on a surface of the first or the second substrate where an electrode is formed.

(8) A reflecting type liquid crystal display device according to the above item (7), wherein the color filter is formed on the light diffusion layer, and the second reflecting layer is formed on the color filter.

(9) A reflecting type liquid crystal display device according to the above item (8), wherein the light diffusion layer is formed of a first and a second transparent refractive index mediums, each having a different refractive index from the other.

(10) A reflecting type liquid crystal display device according to the above item (9), wherein the first transparent refractive index medium contains as a main component a material selected from the group consisting of polystyrene, $SiO_2$ and polyimide, and the second transparent refractive index medium contains as a main component acrylic material constituting a solvent for the first transparent refractive index medium.

(11) A reflecting type liquid crystal display device according to the above item (9), wherein each of the first and the second transparent refractive index mediums has a refractive index falling in a range of: an average refractive index (of the liquid crystal composition)±10%.

(12) A reflecting type liquid crystal display device according to the above item (11), wherein the first transparent refractive index medium has a refractive index which is approximately or nearly equal to ordinary refractive index of the liquid crystal composition, and the second transparent refractive index medium has a refractive index which is approximately or nearly equal to abnormal refractive index of the liquid crystal composition.

(13) A reflecting type liquid crystal display device according to the above item (11), wherein the light diffusion layer is a diffraction grating formed of a first and a second transparent refractive index mediums flatly arrayed.

(14) A reflecting type liquid crystal display device according to the above item (13), wherein the diffraction grating formed of a first and a second transparent refractive index mediums arrayed in a check pattern.

(15) A reflecting type liquid crystal display device according to the above item (11), wherein the first transparent refractive index medium contains as a main component a material selected from the group consisting of polystyrene, $SiO_2$ and polyimide and has a refractive index which is approximately or nearly equal to ordinary refractive index of the liquid crystal composition; the second transparent refractive index medium contains as a main component a material selected from ITO and silicon nitride; and a value of δnD to be obtained when a value of difference in refractive index δn between the second transparent refractive index medium and the first transparent refractive index medium is multiplied by a thickness of the light diffusion layer is in the range of from 0.1 μm to 0.4 μm; said light diffusion layer being a diffraction grating formed of a first and a second transparent refractive index mediums arrayed in a check pattern.

(16) A reflecting type liquid crystal display device according to the above item (1), wherein the second reflecting layer comprises as a main component Al or Ag, and the light diffusion layer comprises two kinds of transparent refractive index mediums.

(17) A reflecting type liquid crystal display device according to the above item (1), wherein the liquid crystal composition contains a dichroic dye.

(18) A reflecting type liquid crystal display device according to the above item (1), wherein the liquid crystal composition is a nematic liquid crystal containing a black dye and exhibiting a positive dielectric anisotropy, molecules thereof being homogeneously oriented between the first and the second substrates, and a quarter wavelength plate and a second reflecting plate are mounted on the second substrate.

(19) A reflecting type liquid crystal display device according to the above item (17), wherein the quarter wavelength plate and the second reflecting plate are mounted on the surface of the second substrate where the second electrode is formed.

(20) A reflecting type liquid crystal display device according to the above item (1), wherein the liquid crystal composition has a light-reflecting function, functioning also as a first reflecting layer.

(21) A reflecting type liquid crystal display device according to the above item (20), wherein the liquid crystal composition is a high molecular dispersion type liquid crystal composition.

(22) A reflecting type liquid crystal display device according to the above item (21), wherein the high molecular dispersion type liquid crystal composition is of an emulsion type.

(23) A reflecting type liquid crystal display device which is an active matrix type liquid crystal display device comprising either a thin film transistor or a thin film diode.

(24) A reflecting type liquid crystal display device according to the above item (23), wherein the first reflecting layer has a function of an interconnection wiring connected with either a thin film transistor or a thin film diode.

(25) A reflecting type liquid crystal display device according to the above item (23), wherein a reflecting plate comprising a concave mirror reflecting lens is disposed on a surface of the second substrate which is opposite to where the second electrode is formed.

The principle of the second and the third embodiments will be explained as follows.

The light diffusion layer is mounted for diffusing an incident light. The diffusion of incident light may be attained by disposing two or more kinds of refractive index mediums in a three-dimensional state, thereby deflecting the light through a difference in refractive index between the refractive index mediums. When this three-dimensional arrangement is made into more multi-directional (random), the diffusion of the light becomes more prominent. Further, the larger the difference in refractive index between the refractive index mediums, the more prominent deflection of light can be achieved, thereby enhancing the diffusion. Furthermore, the higher the diffusion is, the more excellent the viewing angle property of a liquid crystal display device is. However, since the brightness is averaged, the brightness may sometimes be decreased as it is viewed from some direction. As an example of light diffusion method (diffraction effect) wherein two or more of refractive index mediums are arranged into a three-dimensional arrangement, and light is caused to deflect due a difference in refractive index between the refractive index mediums, a technique of dispersing fine particles comprising as a main component polystyrene, $SiO_x$, polyimide, ITO or $SiN_x$ into a medium having a different refractive index (for example, acrylic resin) may be adopted. Alternatively, a technique of dispersing a high molecular polymer such as PDLC into a liquid crystal may be adopted.

Figure 35:
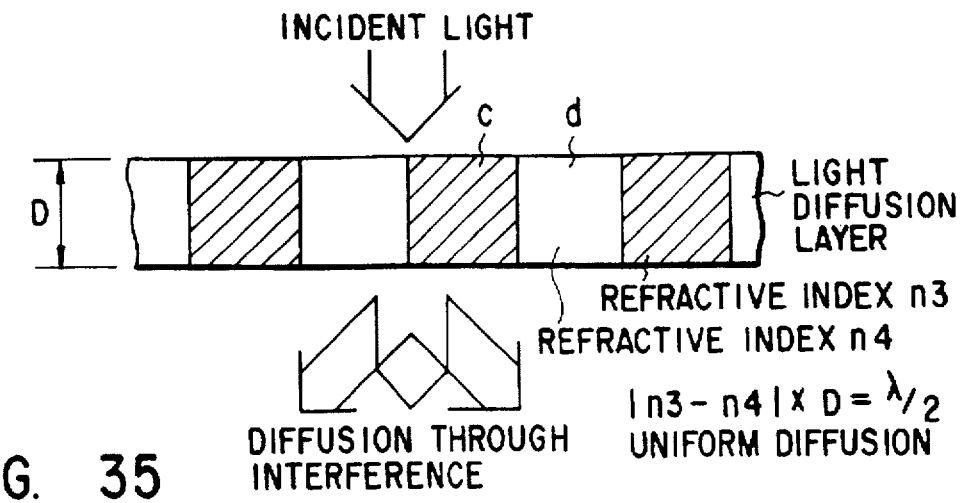
FIG. 35 is a cross-sectional view illustrating the diffraction of a light diffusion layer comprising two kinds of refractive index medium which are two-dimensionally arranged.
Figure 36A:
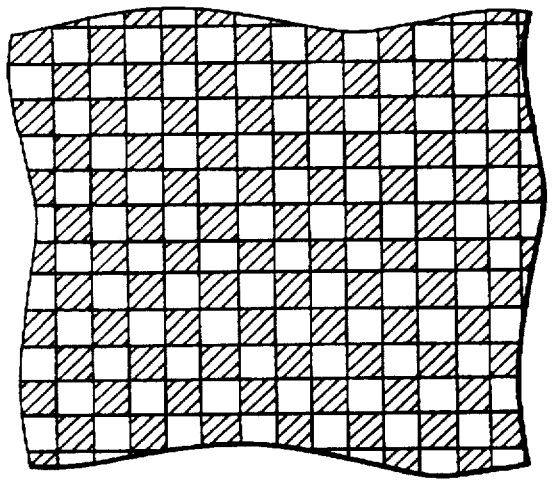
FIGS. 36A to 36C respectively show a plan view illustrating a varied distribution shape of two refractive index mediums.
Figure 36B:
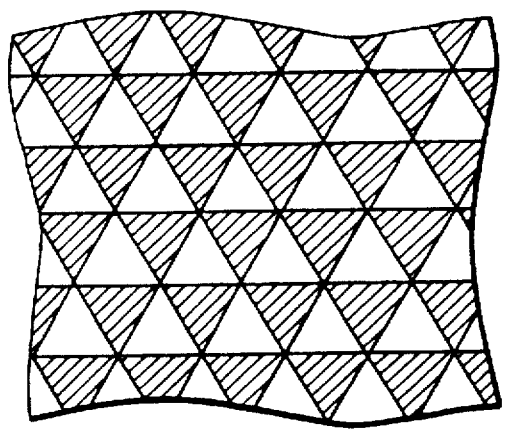
Figure 36C:
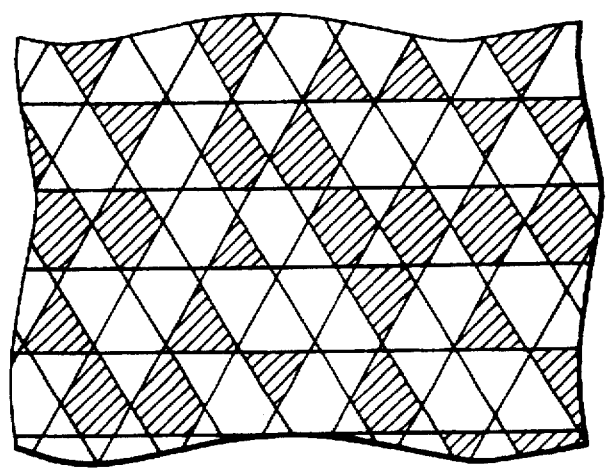

On the other hand, as another method of diffusing light, a method wherein two or more of refractive index mediums are arranged into a two-dimensional arrangement so as to generate diffraction phenomenon of light between mediums, thus causing the light to diffuse may be adopted. For example, when the thickness of layer and the refractive index of the medium are controlled so as to allow the phase between two kinds of mediums to be shifted by one pitch as shown in FIG. 35, the diffusion of light due to diffraction grating effect can be effected. In the diffusion through this diffraction grating effect, the diffusing direction of light is dependent on the shape of distribution of refractive index. When the distribution is two-dimensionally more multi-directional, the direction of diffusion becomes more multi-directional. Therefore, it is preferable to arrange a triangular or square shape unit as a minimum structural unit in a check pattern as shown in FIGS. 36A to 36C. As a specific example, the following process may be adopted, i.e. two or more kinds of refractive index mediums is arranged in a three-dimensional state and patterned in the same manner as in case of method of diffusing light through the deflection of light due to the difference in refractive index between the mediums, and then a film of another medium having a different refractive index from the former medium is formed over the pattern.

Figure 37:
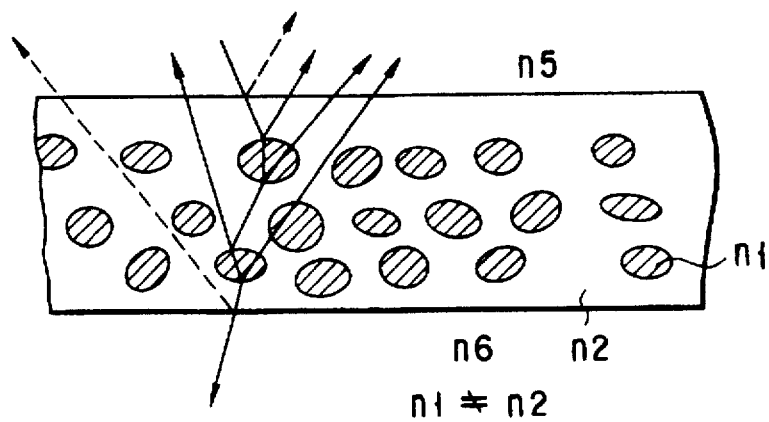
FIG. 37 is a cross-sectional view illustrating the light reflection phenomenon of a light diffusion layer comprising two kinds of refractive index medium which are three-dimensionally arranged.
Figure 38:
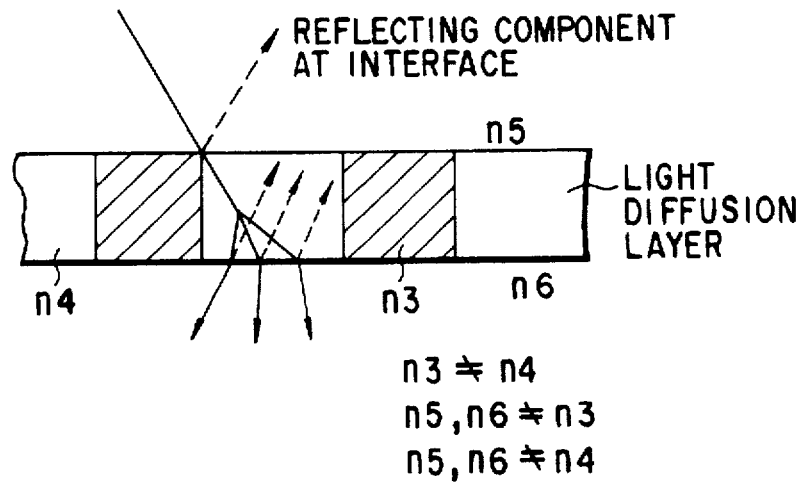
FIG. 38 is a cross-sectional view illustrating the light reflection phenomenon of a light diffusion layer comprising two kinds of refractive index medium which are two-dimensionally arranged.
Figure 39:
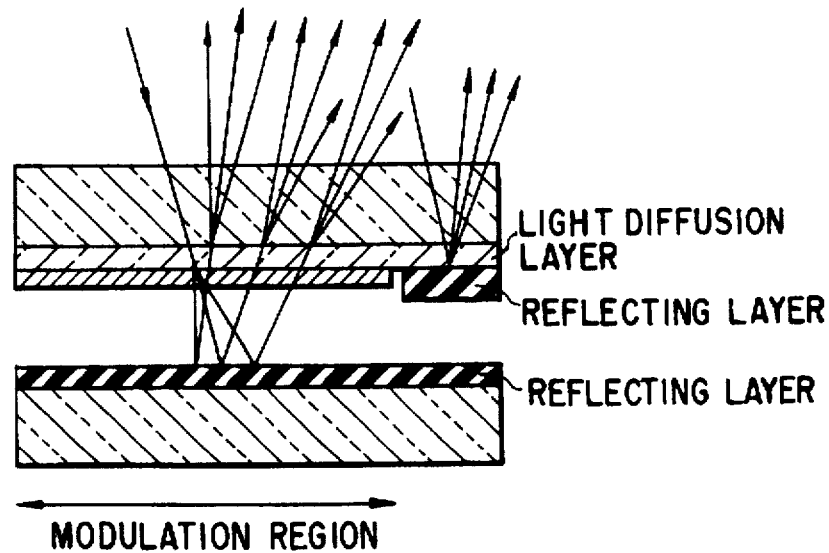
FIG. 39 is a cross-sectional view illustrating the structure of a liquid crystal display device comprising a light diffusion layer and a light reflecting layer which are spaced apart from each other.

The light diffusion layer is only intended to diffuse a light. Accordingly, if a light is reflected by this light diffusion layer, the contrast may be caused to be lowered. Namely, if the light is reflected irrespective of the control of display through a liquid crystal layer, the luminance of black display is lost, resulting in the lowering of contrast ratio. Therefore, the designing of the light diffusion layer should be performed in such a manner as to minimize the generation of reflection. FIGS. 37 and 38 illustrate the behavior of light reflection in two different light diffusion methods. FIG. 37 illustrates a case where an effect by refraction is utilized. Whereas, FIG. 38 illustrates a case where an effect by diffraction is utilized. The reflection of light becomes larger, as the difference in refractive index between the mediums differing in refractive index from each other is larger in any of the cases.

The light diffusion layer may be required to be disposed on both sides of the observing side substrate. It is preferable to dispose the light diffusion layer on the inner side (facing to the liquid crystal layer) of the observation side substrate in view of preventing the generation of blur in display, since the distance between the light diffusion layer and the light controlling layer (a liquid crystal layer) can be minimized. In this case, an interface between the liquid crystal layer and the light diffusion layer may be used as one of interface between the mediums differing in refractive index from each other. In order to minimize the reflection of light, it is preferable to minimize the difference in refractive index between the layers.

In the light diffusion method utilizing an effect by refraction shown in FIG. 37, two or more kinds of refractive index mediums are three-dimensionally dispersed to diffuse the light through a difference in refractive index. Since the intensity of reflection components depends on the difference in refractive index, the trade-off may be resulted between the light diffusion and the reflection components (or contrast ratio). By contrast, in the light diffusion method utilizing an effect by diffraction shown in FIG. 38, there is not required to generate any difference in refractive index in the direction of incident light, so that there is no direct relationship between the intensity of the light diffusion and the intensity of the reflection components. Therefore, the light diffusion method utilizing an effect by diffraction is more desirable in obtaining a preferable light diffusion layer.

The reflection of light can be caused also between the light diffusion layer and other portions, i.e. a liquid crystal layer, an alignment film or a substrate. It is of course preferable to minimize the reflection between these portions. Since the reflection of light becomes larger, as the difference in refractive index between the members is larger as mentioned above, it is desirable to minimize the difference in refractive index between the light diffusion layer and other portions. The light diffusion layer is formed of two or more refractive index mediums, and the difference in refractive index is required for obtaining a diffusion effect. A description concerning the desired value of this difference will be discussed later. Anyway, most preferable result will be obtained when the refractive index of a member (a liquid crystal layer, an alignment film or a substrate) neighboring the light diffusion layer is identical with the average value of refractive index of two or more refractive index mediums of the light diffusion layer.

It has been found through experiments that according to the light diffusion method utilizing an effect by refraction shown in FIG. 37, the difference in refractive index between the light diffusion layer and other member (a liquid crystal layer) in a structure where the light diffusion layer is disposed on the inner surface (facing to the liquid crystal layer) of the observation side substrate should be controlled in the range of: an average refractive index (of liquid crystal composition)+10%. Otherwise, the reflection components may become excessive in reflection intensity.

According to the light diffusion method utilizing an effect by diffraction shown in FIG. 38, the light diffusion is determined by the following formula (1). The higher the value of I is, the higher the light diffusion.

$$I = \sin^2(\pi \cdot \delta n \cdot D / \lambda) \tag{1}$$

I: Light diffusion

δn: The difference in refractive index between two different refractive index mediums of the light diffusion layer (diffraction grating layer)

D: The thickness of the light diffusion layer (diffraction grating layer)

λ: Wavelength of an incident light

The incident light, or light required is of the whole visible light. Accordingly, δn×D may be set in conformity with the central wavelength of visible light. If λ is set to 550 nm and if the value of the formula (1) is desired to be 25% or more (this means that 25% or more of incident light is diffused), the value of δn×D would be 0.1 μm to 0.4 μm. It has been confirmed that if the value of δn×D falls in this range, a sufficient degree of light diffusion can be obtained, even if the reflecting layer is of mirror reflection. If the reflecting layer is of diffusion reflection, the light diffusion can be increased so that as long as the value of δn×D falls in this range, a sufficient degree of light diffusion can be obtained.

In the process of forming a diffraction grating, if one of the refractive index medium is formed from a transparent conductive material, this refractive index medium per se can be used as a electrode. Examples of such a material are ITO and SnOx.

In the case of structure where the light diffusion layer is spaced apart from the reflecting layer, a reflecting layer can be interposed between the light diffusion layer and the liquid crystal layer and at a region which corresponds to at least a portion of the non-modulation region. With this structure, it is possible to obtain the same effect as that when a white reflection layer is disposed on at least a portion of the non-modulation region. In this case, the effect of separately forming the light diffusion layer from the reflecting layer would be simultaneously obtained in addition to the above-mentioned effect.

Various examples of this invention will be hereinafter explained with reference to drawings.

EXAMPLE 1

FIG. 13A to FIG. 16 show a liquid crystal display device of this Example 1.

Figure 13A:
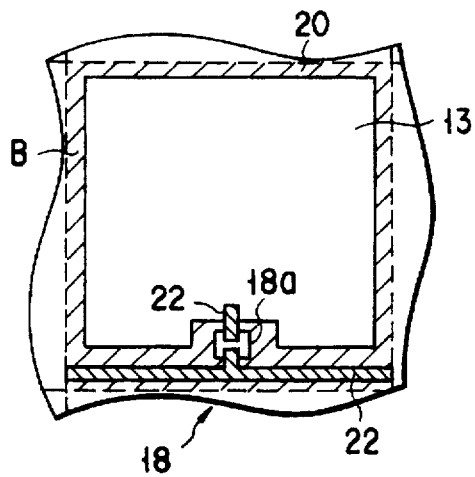
FIGS. 13A to 13D respectively show a plan view illustrating the structure of electrodes of a substrate according to Example 1 of this invention.
Figure 13B:
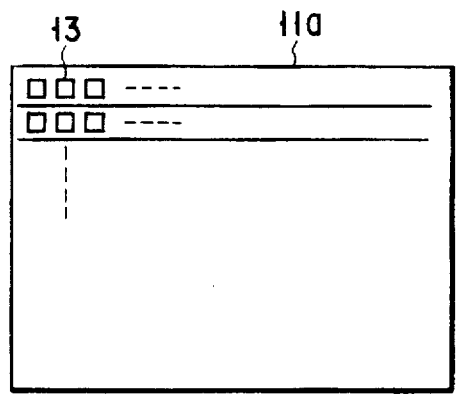

A couple of glass substrates, each having a thickness of 0.7 mm are employed. A pattern of electrode 13 having an MIM device 18 was formed on the surface of an upper substrate 11 to be disposed on the observation side as shown in FIGS. 13A and 13B. FIG. 13A illustrates the shape of electrode of one pixel having a size of 180 μm×180 μm. FIG. 13B illustrates the shape of an effective display region of the upper substrate 11 in which each pixel is arranged in a matrix pattern. Namely, a total of 480×320 pixels arranged within an area of 57.6 mm×86.4 mm.

Figure 14:
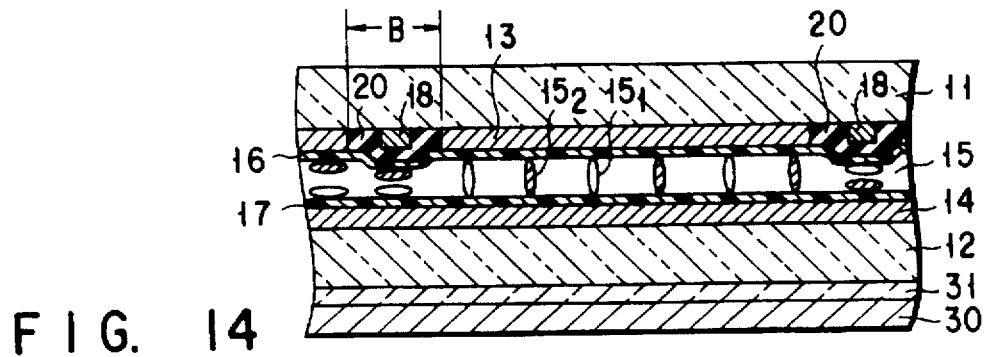
FIG. 14 is a cross-sectional view schematically showing a liquid crystal display device according to Example 1 of this invention.

As shown in FIG. 14, the upper substrate 11 of the observation side is provided with the MIM device 18, a wiring 22 and a transparent electrode 13, and also with a white reflecting layer 20 which is formed on a region excluding the transparent electrode 13, i.e. a non-modulation region B.

On the other hand, the lower substrate 12 facing to the upper substrate 11 is provided with a plurality of stripe-shaped transparent electrodes 14 arranged in parallel so as to correspond to the pixel electrodes. On each of these electrodes 13 and 14 is deposited an alignment films 16 and 17 respectively. A liquid crystal composition layer 15 is interposed between these substrates.

The liquid crystal display device according to this Example 1 can manufactured as follows.

First of all, a first Ta layer 18a having its surface being oxidized (a 1,000 angstrom thick TaO₂ was formed) was formed so as to form a pattern as shown in FIG. 13A on the surface of the upper substrate 11. Then, a second Ta layer 22 (1,000 angstroms) was form so as to form a wiring pattern, a portion of which overlapping the first Ta layer 18a as shown in FIG. 13A.

Subsequently, a 2,000 angstrom thick ITO film was formed all over the surface the upper substrate, and then a positive resist material (OFPR-5000, Tokyo Ohka Co.) was coated all over the ITO film. After being subjected to a preliminary baking for 30 minutes at a temperature of 60° C., the substrate was further subjected to a light exposure using a mask so as to form a pixel electrode pattern and then to a development with NMD3 solution (Tokyo Ohka Co.) thereby forming a resist pattern covering only the region of the ITO film indicated by the reference numeral 13 as shown in FIG. 13A.

Then, the etching of ITO film was performed with an aqueous mixed solution of hydrochloric acid and nitric acid (mixing ration: 10 hydrochloric acid:1 nitric acid:10 water) using the resist pattern as a mask. Thereafter, a resist material having TiO₂ dispersed therein (a TiO₂ dispersion solution: Nihon Gosei Gomu Co.) was printed to a thickness of 2000 angstroms on all over the effective display region 11a of the substrate shown in FIG. 13B without removing the resist pattern. After being subjected to a preliminary baking for 30 minutes at a temperature of 100° C., a portion of the resist covering the ITO film 13 indicated in FIG. 13A was removed with an ST10 solution (Tokyo Ohka Co.).

As a result, a portion of the film of resist material having $TiO_2$ dispersed therein (or $TiO_2$-dispersed resist material) which was disposed on the resist deposited on the ITO film 13 was removed together with the resist, thus forming a pattern of the film of resist material only on a region other than the ITO film 13. Then, in order to completely cure the $TiO_2$-dispersed resist material, the substrate was baked for 30 minutes at a temperature of 180° C., thus forming the white reflecting layer 20 having the feature as illustrated with reference to the first embodiment of this invention on a portion of the back surface of the substrate which corresponds to the non-modulation region B, i.e. a region other than those occupied by the pixel electrode (the ITO film 13 shown in FIG. 13A) and by MIM 18 and wiring region 22.

Figure 13C:
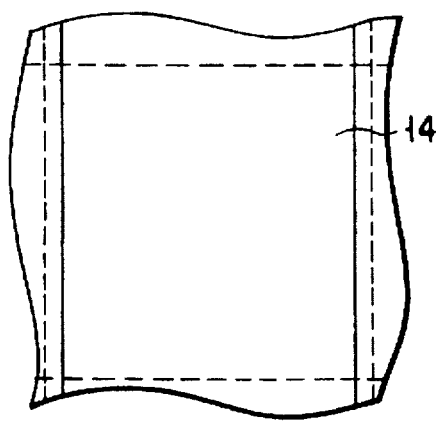
Figure 13D:
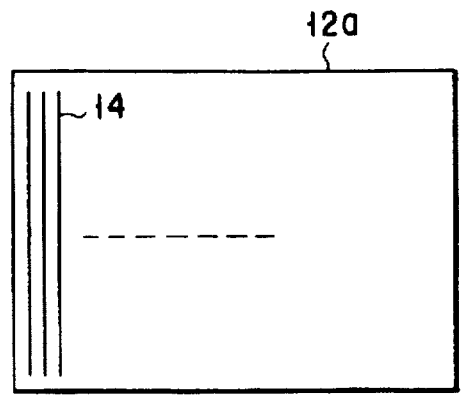

Further, a substrate provided with an ITO stripe pattern electrode 14 as indicated in FIGS. 13C and 13D was prepared as a counter substrate 12. FIG. 13C illustrates the shape of pattern representing one pixel, and FIG. 13D shows the shape of the effective display region 12a.

On the effective display region of each of these two substrates thus treated was formed alignment films 16 and 17 respectively by first printing an aligning agent (AL-1051, Nihon Gosei Gomu Co.) on the effective display region and then baking the aligning agent. Subsequently, these alignment films 16 and 17 were subjected to a rubbing treatment in the direction which is parallel with the stripe pattern of the ITO as well as in such a manner that makes the direction of alignment of the facing substrates reversed to each other by an angle of 180°.

Then, a spacer material (Micropearl SP, Sekisui Fine Chemical Co.) to be disposed between the substrates having a particle diameter of 5 μm was dispersed over a surface of the substrate of observation side at a dispersion density of 100/mm². On the other hand, a peripheral seal pattern provided with an opening 5 mm in width was formed on the peripheral region of the effective display region of the opposed substrate 12 by way of a screen printing. The sealing agent employed in this case was a one-pack type epoxy resin (XN-21, Mitsui Tohatsu Kagaku Co.).

A couple of the substrates 11 and 12 were superimposed with the electrodes 13 and 14 being faced to each other, and then baked for two hours at a temperature of 180° C., while pressing the substrates 11 and 12 in such a manner that the space between the substrates 11 and 12 became identical with the particle diameter of the spacer material, thereby obtaining a blank cell to be employed in a liquid crystal display device of this Example 1. Subsequently, a liquid crystal material comprising a nematic liquid crystal material ZLI-2293 (Merk Japan Co.) 151 exhibiting a positive dielectric anisotropy and 2.0% by weight (based on the liquid crystal material) of a black dye LA 103/4 (Mitsubishi Kasei Co.) was introduced into the blank cell by way of a vacuum injection method, thereby forming a liquid crystal composition layer 15.

Then, the opening of the peripheral seal pattern was sealed with an ultraviolet-curing resin UV-1000 (Sony Chemical Co.), thus obtaining a liquid crystal cell to be used in a liquid crystal display device of this Example 1. Thereafter, a quarter wavelength plate 31 and a reflecting plate 30 were stuck on the substrate 12 to obtain a liquid crystal display device of this invention. The reflecting plate 30 employed in this Example was an M type diffuse reflecting plate (Nitto Denko Co.) which was a diffuse reflecting plate of aluminum vapor deposition type, and the quarter wavelength plate 31 was a full wavelength-range quarter wavelength plate of laminated type (Nitto Denko Co.). These plates 30 and 31 used herein were laminated with an adhesive.

The liquid crystal display device of this Example was provided with the white reflecting layer 20 which was formed of a resist material containing a white pigment and formed on the space region of the substrate 11 of observation side. This white reflecting layer 20 was formed by way of the lift-off method making the most of a resist pattern previously used for forming a pattern of the pixel ITO electrode.

Figures 15A, 15B:
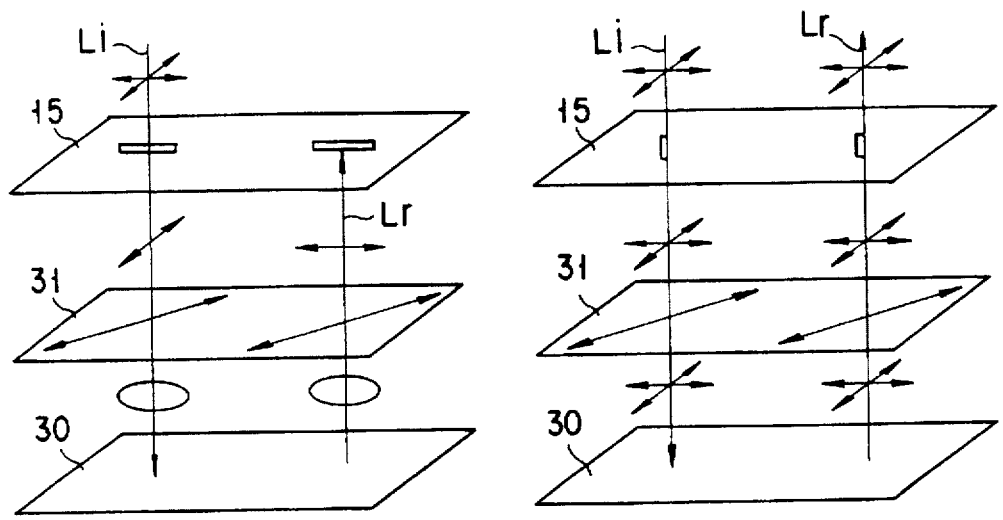
FIGS. 15A and 15B are perspective views illustrating the principle of display of a liquid crystal display device according to the example of this invention.

As for the type of liquid crystal display mode, this liquid crystal display is that of GH type using a liquid crystal composition containing a dye, and also that of construction shown in FIGS. 15A and 15B provided with a quarter wavelength plate. Namely, when no voltage is being applied, a non-polarized incident light Li passes through the liquid crystal composition layer 15 to be turned into a linearly polarized light, and then passes through the quarter wavelength plate 31 to be turned into a circularly polarized light which, after reaching to the reflecting plate 30 as it is, is then reflected by the reflecting plate 30. The circularly polarized light thus reflected passes again through the quarter wavelength plate 31. However, since the direction of the linearly polarized light at this moment is rotated by an angle of 90° in relative to the moment of incidence, the reflected light Lr is interrupted by the liquid crystal composition layer 15. On the other hand, when voltage is being applied, a non-polarized incident light Li passes through the liquid composition layer 15 to be turned into a linearly polarized light, and then passes through the quarter wavelength plate 31 to be turned into a circularly polarized light which, after reaching to the reflecting plate 30 as it is, is then reflected by the reflecting plate 30. The circularly polarized light thus reflected passes again through the quarter wavelength plate 31. However, the reflected light Lr passed through the quarter wavelength plate 31 is not interrupted by the liquid crystal composition layer 15, but passes through the liquid crystal composition layer 15 as it is.

Figure 16:
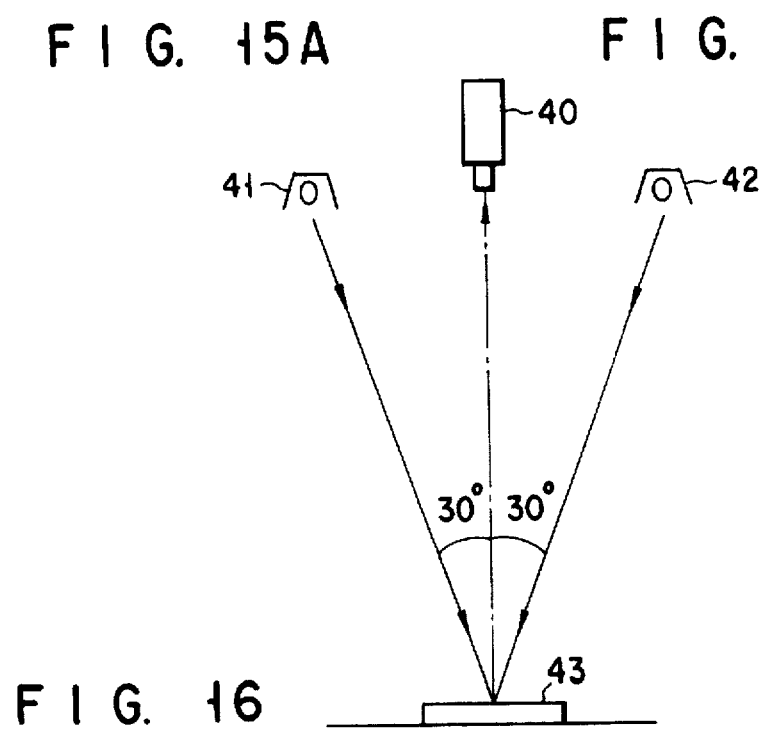
FIG. 16 is a side view an apparatus for illustrating a system for measuring reflectance of a liquid crystal display device.

The reflectance and contrast ratio of the liquid crystal display device of this Example thus obtained were measured with a measuring instrument shown in FIG. 16. In this measurement, a luminance meter 40 was set at a position spaced apart by a distance of 30 cm in the direction of normal line from the center of a sample, and a pair of high color rendering type fluorescent lamps 41 and 42 each emitting three wavelengths of red, green and blue were separately set on both sides of the luminance meter 40 at the same height as that of the luminance meter 40 but separated by an angle of 30° in leftward and rightward from the direction of normal line so as to control the illuminance of the location where the sample was disposed to 580 lux. Under this condition, the luminance of a standard diffusion plate (MgO plate) was measured and the resultant luminance was defined as 100% reflectance, on the basis of which the reflectance and contrast ratio of each sample were measured.

The results thus obtained are shown together with those obtained in other examples.

TABLE

| Sample | Reflectance (%) | Contrast ratio | Remarks |
| --- | --- | --- | --- |
| Example 1 | 80 | 8:1 | |
| Example 2 | 50 | 5:1 | |
| Example 3 | 80 | 9:1 | |
| Example 4 | 78 | 9:1 | |
| Example 5 | 85 | 9:1 | |
| Example 6 | 50 | — | |
| Example 7 | 40 | 13:1 | |
| Example 8 | 85 | 7:1 | |
| Example 9 | 90 | 10:1 | |
| Example 10 | 45 | 6:1 | |
| Comparative Example 1 | 60 | 9:1 | Comparative Example to Examples 1 and 8 |
| Comparative Example 2 | 25 | 6:1 | Comparative Example to Example 2 |
| Comparative Example 3 | 60 | 10:1 | Comparative Example to Examples 3, 4 and 5 |
| Comparative Example 4 | 35 | — | Comparative Example to Example 6 |
| Comparative Example 5 | 30 | 15:1 | Comparative Example to Example 7 |
| Comparative Example 6 | 70 | 11:1 | Comparative Example to Example 9 |

As seen from these results, it had been found that when a voltage was applied to the entire surface (all pixels) so as to adjust the voltage impressed to the liquid crystal layer to become 4 volts by using MIM device, a high reflectance of as high as 80% could be obtained. Further, when the contrast ratio was measured by applying voltages to the entire surface (all pixels) so as to adjust the voltage impressed to the liquid crystal layer to become 0 volt on one hand, and 4 volts on the other hand by using MIM device, a high contrast ratio of as high as 8:1 could be obtained.

COMPARATIVE EXAMPLE 1

A liquid crystal display device having the same structure as obtained in Example 1 except that the white reflecting layer was omitted was prepared. Namely, excepting the white reflecting layer, the same materials and process were employed as employed in Example 1. With this liquid crystal display device, the reflectance and contrast ratio of each sample were measured, finding that the reflectance was 60% which was very low as compared with that obtained in Example 1. Further, the contrast ratio in this case was found to be 9:1, thus indicating a sufficiently high contrast ratio that had been obtained with the liquid crystal display device of Example 1 of this invention even though a white reflecting layer is formed therein.

EXAMPLE 2

Figure 17A:
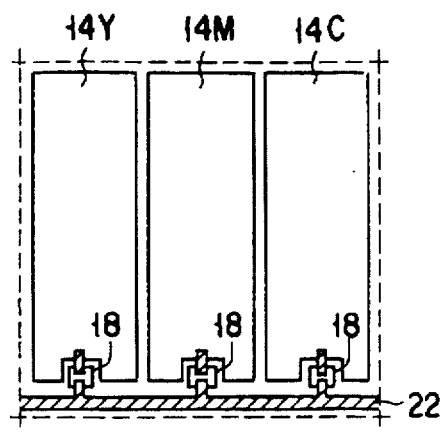
FIGS. 17A to 17D respectively show a plan view illustrating the structure of electrodes and color filter of a substrate according to Example 2 of this invention.
Figure 17B:
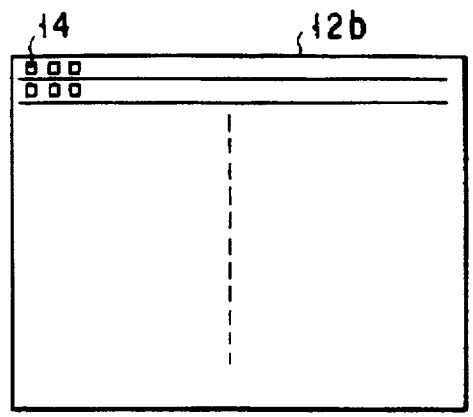

A couple of glass substrates, each having a thickness of 0.7 mm are employed. As a lower substrate 12, a substrate having an MIM device 18 was prepared as shown in FIGS. 17A and 17B. FIG. 17A illustrates the shape of electrode of one pixel having a size of 180 µm×180 µm in which an electrode 14Y for yellow color, an electrode 14M for magenta color and an electrode 14C for cyan color are disposed. FIG. 17B illustrates the shape of an effective display region of the substrate in which a total of 480(×3) ×320 pixels are arranged. This substrate 12 was used as counter substrate of observation side. According to this Example, all of the patterns were formed without using a lift-off method, but removing each resist layer.

Figure 17D:
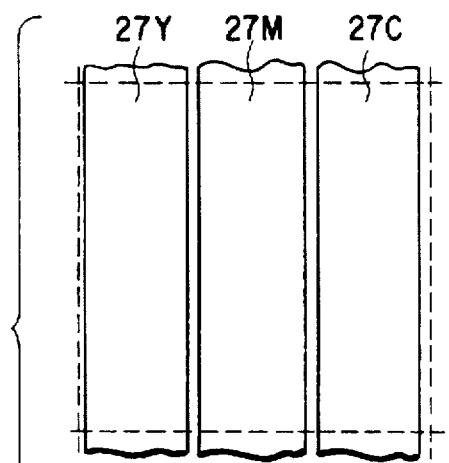
Figure 17C:
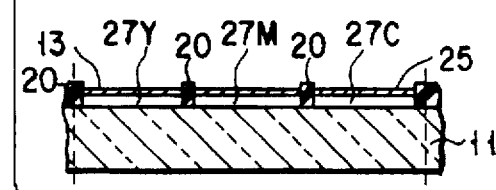

Then, as a substrate of observation side, a color filter-attached substrate as shown in FIGS. 17C and 17D. Namely, a substrate provided with a color filter 27 comprising a three-color layer consisting of yellow 27Y, magenta 27M and cyan 27C was employed and an ITO film 2,000 angstroms in thickness was formed on the entire surface of this color filter-attached substrate. The thickness of each color filter was 18,000 angstroms.

Then, a positive resist material (OFPR-5000, Tokyo Ohka Co.) was coated all over the ITO film. After being subjected to a preliminary baking for 30 minutes at a temperature of 60° C., the substrate was further subjected to a light exposure using a mask for forming a pattern of ITO film 13 as shown in FIG. 17C, and then to a development with NMD3 solution (Tokyo Ohka Co.) thereby forming a resist pattern covering only the region of the ITO film 13 indicated in FIG. 17C. Then, the etching of ITO film was performed with an aqueous mixed solution of hydrochloric acid and nitric acid (mixing ration: 10 hydrochloric acid:1 nitric acid:10 water) using the resist pattern as a mask.

Thereafter, a resist material having $TiO_2$ dispersed therein (a $TiO_2$ dispersion solution: Nihon Gosei Gomu Co.) was printed to a thickness of 2000 angstroms on all over the effective display region of the substrate shown in FIG. 17D. After being subjected to a preliminary baking for 30 minutes at a temperature of 100° C., a portion of the resist covering the ITO film 13 indicated in FIG. 17C was removed with an ST10 solution (Tokyo Ohka Co.).

As a result, a portion of the film of resist material having $TiO_2$ dispersed therein which was disposed on the resist deposited on the ITO film 13 was removed together with the resist, thus forming a pattern of the film of resist material only on a region other than the ITO film 13.

Then, in order to completely cure the $TiO_2$-dispersed resist material, the substrate was baked for 30 minutes at a temperature of 180° C., thus forming the white reflecting layer 20 having the feature as illustrated with reference to the first embodiment of this invention on a portion of the back surface of the substrate which corresponds to a region other than those occupied by the color portion of the color filter within the effective display region.

In this effective display region, the thickness of the white reflecting layer and the thickness of the color portion of the color filter (thickness of the color filter+thickness of ITO) are both 20,000 angstroms, so that there is no step portion on the surface of the display region.

The effective display region according to this Example is constructed in such a manner that any step portion between the color portion of the color filter and a region other than this color portion is eliminated by the presence of the white reflecting layer.

Figure 18:
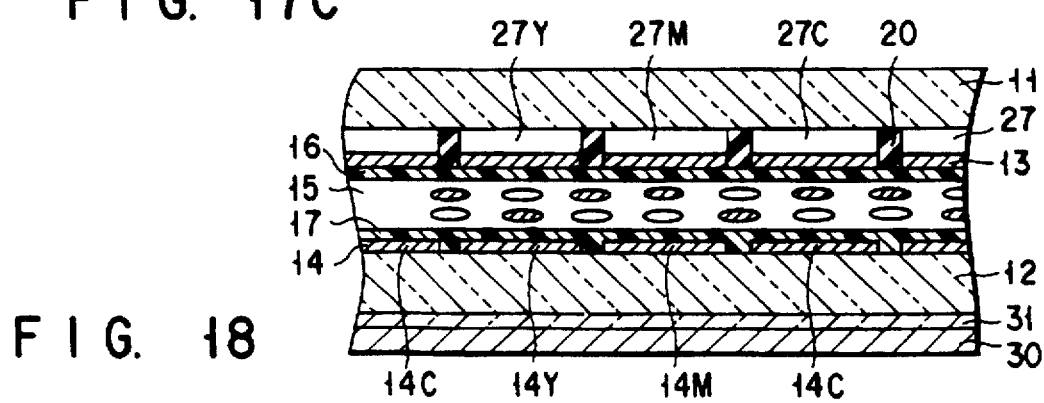
FIG. 18 is a cross-sectional view schematically showing a liquid crystal display device according to Example 2 of this invention.

The couple of substrates thus formed was manufactured into a cell as shown in FIG. 18 by employing the same materials and process as employed in Example 1, and then a quarter wavelength plate 31 and a reflecting plate 30 were attached by employing the same materials and process as employed in Example 1, thus obtaining a liquid crystal display device.

The reflectance and contrast ratio of the liquid crystal display device of this Example thus obtained were measured in the same way as in Example 1, thereby achieving a high reflectance of 50% in spite of the light absorption by the color filter. Further, when the contrast ratio was measured, a high contrast ratio of 5:1 could be obtained.

COMPARATIVE EXAMPLE 2

A liquid crystal display device having the same structure as obtained in Example 2 except that the white reflecting layer was omitted was prepared. Namely, excepting the white reflecting layer, the same materials and process were employed as employed in Example 2. With this liquid crystal display device, the reflectance and contrast ratio of each sample were measured, finding that the reflectance was 25% which was very low as compared with that obtained in Example 2. Further, the contrast ratio in this case was found to be 5:1, thus indicating a sufficiently high contrast ratio that had been obtained with the liquid crystal display device of Example 2 of this invention even though a white reflecting layer was formed therein.

EXAMPLE 3

A couple of glass substrates, each having a thickness of 0.7 mm were employed, one (11) of the substrates being provide with a TFT 18. FIG. 19A illustrates the shape of electrode of one pixel, and FIG. 19B illustrates the shape of an effective display region. Each pixel had a size of 180 µm×180 µm, and the number of pixel in the effective display region was 480×320 in total. The substrate 11 was employed as a substrate of observing side.

In the same manner a shown in FIG. 13A, the substrate 11 was provided on its surface with the TFT switching element 18. Subsequently, a 2,000 angstrom thick ITO film was formed all over the surface of the substrate 11, and then a positive resist material (OFPR-5000, Tokyo Ohka Co.) was coated all over the ITO film. After being subjected to a preliminary baking for 30 minutes at a temperature of 60° C., the substrate was further subjected to a light exposure using a mask for forming a pixel electrode pattern comprising an array of squares as shown in the drawing and then to a development with NMD3 solution (Tokyo Ohka Co.) thereby forming a resist pattern covering only the region of the ITO film 13 to be subsequently utilized as an electrode.

Then, the etching of ITO film was performed with an aqueous mixed solution of hydrochloric acid and nitric acid (mixing ration: 10 hydrochloric acid:1 nitric acid:10 water) using the resist pattern as a mask. Thereafter, a resist material having TiO$_2$ dispersed therein (a TiO$_2$ dispersion solution: Nihon Gosei Gomu Co.) was printed to a thickness of 2000 angstroms on all over the effective display region 11c of the substrate 11 shown in FIG. 19B without removing the resist pattern. After being subjected to a preliminary baking for 30 minutes at a temperature of 100° C., a portion of the resist covering only the ITO film 13 indicated in FIG. 19A was removed with an ST10 solution (Tokyo Ohka Co.).

As a result, a portion of the film of resist material having TiO$_2$ dispersed therein (or TiO$_2$-dispersed resist material) which was disposed on the resist deposited on the ITO film 13 was removed together with the resist, thus forming a pattern of the film of resist material only on a region other than the ITO film 13. Then, in order to completely cure the TiO$_2$-dispersed resist material, the substrate was baked for 30 minutes at a temperature of 180° C., thus forming the white reflecting layer 20 having the feature as illustrated with reference to the first embodiment of this invention on a portion of the back surface of the substrate, excluding those occupied by the pixel electrode (the ITO film 13 shown in FIG. 19A) and by MIM 18 and wiring region 22 (gate wiring and signal wiring).

On the other hand, a substrate provided with a solid ITO electrode (not shown) was employed as a counter substrate, and an aligning agent (AL-1051, Nihon Gosei Gomu Co.) was printed and baked. Subsequently, these substrates facing to each other were subjected to a rubbing treatment in such a manner that makes the direction of alignment of the facing substrates reversed to each other by an angle of 180°.

Then, a spacer material (Micropearl SP, Sekisui Fine Chemical Co.) to be disposed between the substrates and having a particle diameter of 8 µm was dispersed over a surface of the substrate of observation side at a dispersion density of 100/mm$^2$. On the other hand, a peripheral seal pattern provided with an opening 5 mm in width was formed on the peripheral region of the effective display region of the opposed substrate by way of a screen printing. The sealing agent employed in this case was a one-pack type epoxy resin (XN-21, Mitsui Tohatsu Kagaku Co.).

Then, these two substrates were superimposed with their electrodes being faced to each other, and then baked for two hours at a temperature of 180° C., while pressing these substrates in such a manner that the space between the substrates became identical with the particle diameter of the spacer material, thereby obtaining a blank cell to be employed in a liquid crystal display device of this Example 3. Subsequently, a liquid crystal material comprising a nematic liquid crystal material ZLI-2293 (Merk Japan Co.) exhibiting a positive dielectric anisotropy, 2.0% by weight (based on the liquid crystal material) of chiral material (S1011, Merk Japan Co.) and 2.0% by weight (based on the liquid crystal material) of a black dye (LA 103/4, Mitsubishi Kasei Co.) was introduced into the blank cell by way of a vacuum injection method, and then, the opening of the peripheral seal pattern was sealed with an ultraviolet-curing resin UV-1000 (Sony Chemical Co.), thereby forming a liquid crystal cell to be used in the liquid crystal display device.

The liquid crystal display device prepared in this Example is of PC-GH type LCD, and helical pitch of the liquid crystal material used was set to 1.4 µm (which was controlled the amount of the chiral material). Since this helical pitch was sufficiently shorter than the thickness of the liquid crystal layer (set to 8 µm), the axis of the helical line was shifted from the normal line, and the orientation of the molecule of dye became random when voltage was not being applied, hence a sufficient light absorption effect (an effect to get a black state) could be obtained.

Then, an M type diffuse reflecting plate (Nitto Denko Co.) was stuck on the outer surface of the counter substrate of the liquid crystal cell thus obtained in the same way as illustrated in Example 1, whereby obtaining the liquid crystal display device of this invention.

Further, when the reflectance and contrast ratio of the liquid crystal display device of this Example thus obtained were measured in the same way as in Example 1, a high reflectance of 80% could be obtained when a voltage was applied to the entire surface (all pixels) so as to adjust the voltage impressed to the liquid crystal layer to become 4 volts by using TET device. Likewise, when the contrast ratio was measured by applying voltages to the entire surface (all pixels) so as to adjust the voltage impressed to the liquid crystal layer to become 0 volt on one hand, and 4 volts on the other hand by using TET device, a high contrast ratio of as high as 9:1 could be obtained. The one of the reasons of achievement of a higher contrast ratio as compared with Example 1 can be attributed to the employment of TET device as a switching device which is very effective in enhancing the effect of this invention.

EXAMPLE 4

A liquid crystal display device having the same structure as obtained in Example 3 was prepared by employing the same materials, and process as in Example 3 except that MgO was employed as a white pigment for constituting the white reflecting layer. With this liquid crystal display device, the reflectance and contrast ratio of each sample were measured under a driving voltage of 14V as in the case of Example 3 and using the same process as illustrated in Example 1, finding that the reflectance was 78% which was very high as compared with that obtained in Example 3. Further, the contrast ratio in this case was found to be 9:1, indicating a very high value.

COMPARATIVE EXAMPLE 3

A liquid crystal display device having the same structure as obtained in Example 3 except that the white reflecting layer was omitted was prepared. Namely, excepting the white reflecting layer, the same materials and process were employed as employed in Example 3. With this liquid crystal display device, the reflectance and contrast ratio of each sample were measured in the same manner as in Example 1, finding that the reflectance was 60% which was very low as compared with that obtained in Examples 3 and 4. Further, the contrast ratio in this case was found to be 10:1, thus indicating a sufficiently high contrast ratio that had been obtained with the liquid crystal display devices of Examples 3 and 4 of this invention even though a white reflecting layer was formed therein.

EXAMPLE 5

A couple of glass substrates, each having a thickness of 0.7 mm were employed, one of the substrates being provide with a TFT 18 as shown in FIGS. 19A and FIG. 19B. FIG. 19A illustrates the shape of electrode of one pixel, and FIG. 19B illustrates the shape of an effective display region. The number of pixel in the effective display region was 480×320 in total. This substrate was employed as a counter substrate for the substrate of observing side. This observing side substrate was formed by being deposited thereon with a pattern of a white reflecting layer on which a solid ITO electrode was formed.

To be more specific, 1,000 thick alumina ($Al_2O_3$) was vapor-deposited on this observing side substrate, which was then patterned by way of photolithography in such a manner that the alumina could be formed only on the area of non-modulation region which corresponds to the region where the space region and wiring region of the counter substrate were located. Thereafter, the ITO film was formed all over the surface of the substrate where the alumina film was deposited in advance.

These two substrates were used to prepare a liquid crystal display device of this invention by employing the same materials and process as employed in Examples 3 and 4, thus obtaining the same structure as illustrated in Examples 3 and 4. This Example differs however from those of Examples 3 and 4 in that the formation of the pattern was performed by way of the conventional photolithography. The employment of this photolithography can be adopted when the white reflecting layer is mounted on the observation side substrate and the TFT substrate is used as a counter substrate (due for example to the restriction in packaging an element). Even though this process requires the conventional photolithography in the formation of a pattern, it makes it possible to easily form the white reflecting layer all over the non-modulation region thus enabling a much higher reflectance to be obtained.

To this liquid crystal display device, the reflectance and contrast ratio were measured under a driving voltage of 14V as in the case of Example 3 and using the same process as illustrated in Example 1, the reflectance was found to be 85% which was very high as compared with that obtained in Examples 3 and 4. Likewise, the contrast ratio was measured finding a very high value of 9:1.

EXAMPLE 6

A couple of glass substrates 11 and 12, each having a thickness of 0.7 mm were employed. FIG. 20A illustrates the counter substrate 12 provided with a segment electrode pattern 14, and FIG. 20B illustrates the observation side substrate 11 provided with an electrode pattern consisting of ITO film. Alignment films 16 and 17 were formed respectively over the electrode layer of each substrate as shown in FIG. 21 by printing an aligning agent (AL-1051, Nihon Gosei Gomu Co.) on the effective display region and then baked. Subsequently, these alignment films 16 and 17 were subjected to a rubbing treatment in the directions shown by the arrow r1 and r2 as shown in FIGS. 20A and 20B (or in a manner that makes the direction of alignment of the facing substrates reversed to each other by an angle of 180°).

Then, a spacer material (Micropearl SP, Sekisui Fine Chemical Co.) to be disposed between the substrates having a particle diameter of 2.5 µm was dispersed over a surface of the substrate 11 of observation side at a dispersion density of 100/$mm^2$. On the other hand, a peripheral seal pattern provided with an opening 5 mm in width was formed on the peripheral region of the effective display region of the counter substrate 12 by way of a screen printing. The sealing agent employed in this case was a one-pack type epoxy resin (XN-21, Mitsui Tohatsu Kagaku Co.).

Thereafter, these two substrates 11 and 12 were superimposed with the electrodes being faced to each other, and then baked for two hours at a temperature of 180° C., while pressing the substrates 11 and 12 in such a manner that the space between the substrates 11 and 12 became identical with the particle diameter of the spacer material, thereby obtaining a blank cell to be employed in a liquid crystal display device of this Example. Subsequently, a liquid crystal material 15 comprising a nematic liquid crystal material ZLI-2293 (Merk Japan Co.) exhibiting a positive dielectric anisotropy was introduced into the blank cell by way of a vacuum injection method, and then, the opening of the peripheral seal pattern was sealed with an ultraviolet-curing resin UV-1000 (Sony Chemical Co.), thus obtaining a liquid crystal cell to be used in a liquid crystal display device of this Example. Thereafter, in order to manufacture the structure shown in FIG. 21, a polarizing plate 32 (LLC 298-18SF, Sunritu Co.) was stuck on the outer surface of the observation side substrate 11 in such a manner that the absorption axis was directed at an angle of 45° from the direction of the rubbing. On the other hand, a reflecting plate 30 (an M type diffuse reflecting plate, Nitto Denko Co.) was stuck on the outer surface of the counter substrate 12. Thereafter, a resist material having $TiO_2$ dispersed therein (a $TiO_2$ dispersion solution: Nihon Gosei Gomu Co.) was printed to a thickness of 2000 angstroms on the surface of the polarizing plate 32 while leaving an open window exposing the segment electrode. Then, the resist material was baked for 120 minutes at a temperature of 70° C., thereby forming a white reflecting layer 20 on a portion of the surface of the polarizing plate, which corresponds, when viewed in plane, to the non-modulation region.

Since the display pattern according to this Example is not formed of a unit based on one pixel, a set of one modulation region and one non-modulation region should not be regarded as one display unit. Accordingly, it would be meaningless to evaluate the contrast ratio by combining the modulation region and non-modulation region. Therefore, in this Example, only the reflectance was measured in the same manner as in Example 1. As a result, the reflectance in the state of not impressing a voltage was found to be as high as 50% in spite of the fact that a polarizing plate was employed in this case. Further, when the modulation region was turned into a black state by impressing a voltage of 5V, a display of very excellent visibility was obtained.

COMPARATIVE EXAMPLE 4

A liquid crystal display device having the same structure as obtained in Example 6 except that the white reflecting layer was omitted was prepared. Namely, excepting the white reflecting layer, the same materials and process as employed in Example 3 were employed. With this liquid crystal display device, the reflectance was measured in the same manner as in Example 6, finding that the reflectance under the condition of not impressing a voltage was 35% which was very low as compared with that obtained in Example 6.

EXAMPLE 7

FIG. 22 shows a liquid crystal display device according to this Example 7.

A couple of the same glass substrates 11 and 12 provided with electrodes as employed in Example 1 were employed. The observation side substrate 11 was provided on the periphery of the electrode 13 thereof with a white reflecting layer 20. Alignment films 16 and 17 were formed respectively over the electrodes 13 and 14 of each substrate by printing an aligning agent (AL-1051, Nihon Gosei Gomu Co.) on the effective display region and then baked. Subsequently, these alignment films 16 and 17 were subjected to a rubbing treatment in a manner that the rubbing directions of the substrates were crossed by an angle of 90° when these substrates were superimposed with their electrodes being faced to each other.

Then, a spacer material (Micropearl SP, Sekisui Fine Chemical Co.) to be disposed between the substrates having a particle diameter of 4.5 µm was dispersed over a surface of the substrate 11 of observation side at a dispersion density of 100/mm$^2$. On the other hand, a peripheral seal pattern provided with an opening 5 mm in width was formed on the peripheral region of the effective display region of the counter substrate 12 by way of a screen printing.

The sealing agent employed in this case was a one-pack type epoxy resin (XN-21, Mitsui Tohatsu Kagaku Co.).

Thereafter, these two substrates 11 and 12 were superimposed with the electrodes being faced to each other, and then baked for two hours at a temperature of 180° C., while pressing the substrates 11 and 12 in such a manner that the space between the substrates 11 and 12 became identical with the particle diameter of the spacer material, thereby obtaining a blank cell to be employed in a liquid crystal display device of this Example. Subsequently, a liquid crystal material comprising a nematic liquid crystal material ZLI-2293 (Merk Japan Co.) exhibiting a positive dielectric anisotropy was introduced into the blank cell by way of a vacuum injection method, and then, the opening of the peripheral seal pattern was sealed with an ultraviolet-curing resin (UV-1000, Sony Chemical Co.), thus obtaining a liquid crystal cell to be used in a liquid crystal display device of this Example. Thereafter, polarizing plates (LLC 298-18SF, Sunritu Co.) 32 and 33 were stuck respectively on the outer surfaces of these substrates in such a manner that the absorption axis was in parallel with the direction of the rubbing. On the other hand, a reflecting plate 30 (an M type diffuse reflecting plate, Nitto Denko Co.) was stuck on the outer surface of the polarizing plate of the counter substrate 12, thereby obtaining a liquid crystal display device.

To this liquid crystal display device, the reflectance and contrast ratio were measured under a driving voltage of 4V using the same process as illustrated in Example 1. As a result, the reflectance was found to be 40% which was very high in spite of the fact that a couple of polarizing plates were employed. Likewise, the contrast ratio was measured finding a very high value of 13:1.

COMPARATIVE EXAMPLE 5

A liquid crystal display device having the same structure as obtained in Example 7 except that the white reflecting layer was not formed on the inner surface of the cell was prepared. Namely, excepting the white reflecting layer, the same materials and process were employed as employed in Example 7. With this liquid crystal display device, the reflectance and contrast ratio were measured in the same manner as in Example 1, finding that the reflectance was 30% which was very low as compared with that obtained in Example 7. Further, the contrast ratio measured likewise was found to be 15:1, thus indicating a sufficiently high contrast ratio that had been obtained with the liquid crystal display devices of Example 7 of this invention even though a white reflecting layer was formed therein.

EXAMPLE 8

A couple of the same glass substrates 11 and 12, each having a thickness of 0.7 mm were employed. One of these substrates, i.e. the substrate 12 was formed into an MIM device-attached substrate as shown in FIGS. 13A and 13B. Different from the substrate shown in FIG. 13A, this substrate 12 was employed as a counter substrate in relative to the observation substrate.

Namely, the same structure as that of Example 1 shown in FIGS. 13A to 13D was employed except that the reverse side of the cell was used as the observation side.

As an observation side substrate 11, a substrate provided with ITO stripe pattern electrodes as shown in FIGS. 13C and 13D was prepared. All of the patterns in this Example were formed, without employing the lift-off method, by removing each of the resists every time.

Thereafter, a resist material having TiO$_2$ dispersed therein (a TiO$_2$ dispersion solution: Nihon Gosei Gomu Co.) was printed to a thickness of 2000 angstroms on all over the effective display region on the surface of the substrate provided with ITO stripe pattern electrodes shown in FIGS. 13C and 13D. After being subjected to a preliminary baking for 30 minutes at a temperature of 60° C., the substrate was further subjected to a light exposure using a mask for forming a pattern on a region (that is, only the non-modulation region B) of the observation side substrate shown in FIG. 13C, i.e. a region facing to the region excluding the pixel electrode 14 of the counter substrate 12 (or ITO film 13 shown in FIG. 13A). Then, the substrate was developed with NMD3 solution (Tokyo Ohka Co.) thereby forming a white reflecting layer 20 all over the non-modulation region of the observation side substrate.

These two substrates thus formed was manufactured into a liquid crystal cell by employing the same materials and process as employed in Example 1, and then a quarter wavelength plate 31 and a reflecting plate 30 were attached to the outer surface of the counter substrate 12, thus obtaining a liquid crystal display device of this invention.

This Example differs from Example 1 in that a photolithography was employed for forming a pattern of the white reflecting layer 20 without employing the lift-off method. In this case, the number of manufacturing steps may be increased, but it is possible to easily deposit the white reflecting layer all over the non-modulation region, and at the same time, to improve the reflectance.

The reflectance and contrast ratio of this liquid crystal display device were measured under a driving voltage of 4V using the same process as illustrated in Example 1. As a result, the reflectance was found to be 85% which was very high as compared with that of the liquid crystal display device of Example 1. Likewise, the contrast ratio was measured finding a very high value of 7:1.

EXAMPLE 9

The observation side substrate used in Example 5 was used for preparing a TFT device-attached substrate 12 as shown in FIGS. 24A and 24B.

Specifically, a gate wiring 22a, a signal wiring 22b and a TFT device 18 were formed on this glass substrate 12, and after forming a 2,000 angstrom thick aluminum layer all over the surface of the glass substrate, the aluminum layer was oxidized by way of anodic oxidation process thereby forming an alumina layer. Then, the Al conductive layer 34 and alumina layer 35 were etched so as to form a square pixel electrode 14. As a result, a counter substrate functioning as a diffusion reflecting plate comprising a pixel electrode 14a formed of an Al conductive layer 34 having alumina layer 35 thereon was obtained.

A pair of substrates thus obtained were employed to form a liquid crystal cell using the same materials and the same process. As a result, a liquid crystal display device adhered with no reflecting plate was obtained. This Example illustrates an example of liquid crystal cell wherein the function of the reflecting plate is borne by a pixel electrode formed on the inner surface of the cell. Even though it may be troublesome to prepare the pixel electrode having the function of reflecting plate, it is possible to improve the reflectance as compared with the structure wherein a reflecting plate is attached to the outer surface of the counter substrate, because the optical path thereof is constructed as such that light passes only one substrate to be subsequently reflected by a reflecting plate.

The reflectance and contrast ratio of this liquid crystal display device were measured as in the case of Example 5 under a driving voltage of 14V using the same process as illustrated in Example 1. As a result, the reflectance was found to be 90% which was much higher than that of the liquid crystal display device of Example 5. Likewise, the contrast ratio was measured finding a very high value of 10:1.

COMPARATIVE EXAMPLE 6

A liquid crystal display device having the same structure as obtained in Example 9 except that the white reflecting layer was not formed on the inner surface of the cell was prepared under the same conditions and with the same process as employed in Example 9. With this liquid crystal display device, the reflectance and contrast ratio were measured in the same manner as in Example 1, finding that the reflectance was 70% which was very low as compared with that obtained in Example 9. Further, the contrast ratio measured likewise was found to be 11:1, thus indicating a sufficiently high contrast ratio that had been obtained with the liquid crystal display devices of Example 9 of this invention even though a white reflecting layer was formed therein.

EXAMPLE 10

Figure 25A:
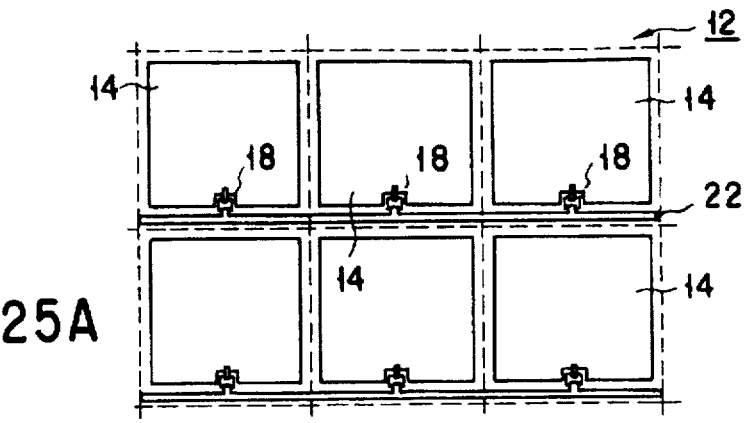
FIGS. 25A to 25C respectively show a plan view of the electrodes of a substrate employed in Example 10 of this invention and a cross-sectional view of a liquid crystal display device according to Example 10 of this invention.
Figure 25B:
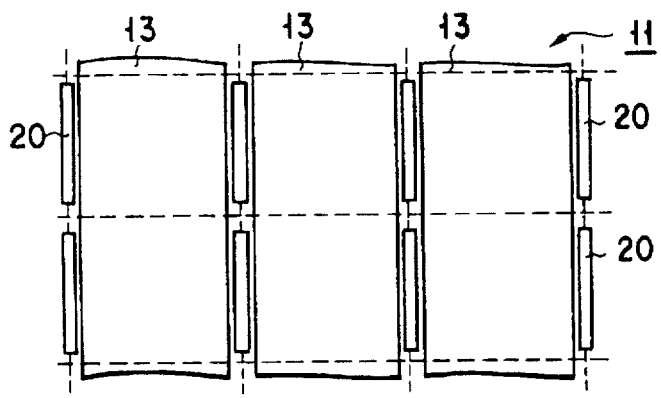
Figure 25C:
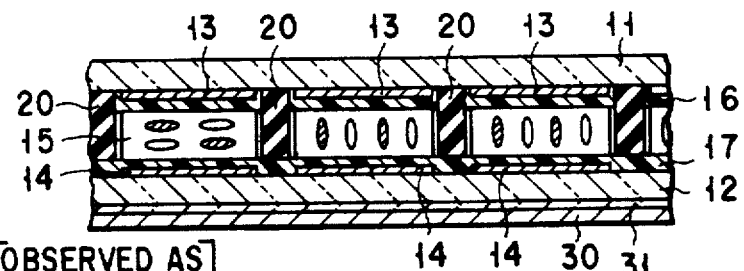

FIG. 25A illustrates a counter substrate 12, FIG. 25B shows an observation side substrate 11 and FIG. 25C shows a cross-sectional view of the cell. On this counter substrate 12 was formed ITO pixel electrodes 14 provided respectively with an MIM device 18 and arrayed in a matrix form. Between the upper column of electrode 14 and the lower column of electrode 14 was disposed a wiring 22 extending along these columns. The whole surface of the substrate 12 was covered with an alignment film 17.

On the other hand, the observation side substrate 11 was provided with a plurality of stripe electrodes 13 extending along the columns. A white reflecting layer 20 was formed on a space formed between the stripe electrodes 13 functioning also as a spacer separating one substrate from another substrate and determining the thickness of a liquid crystal composition. The whole surface of the substrate 11 was covered with an alignment film 16.

The white reflecting layer 20 was formed as follows. A resist material having $TiO_2$ dispersed therein (a $TiO_2$ dispersion solution: Nihon Gosei Gomu Co.) was printed to a thickness of 5 μm on the surface of the substrate 11 provided with stripe pattern electrodes. After being subjected to a preliminary baking for 30 minutes at a temperature of 60° C., the substrate 11 was further subjected to a light exposure using a mask for forming an intermittent bar-like pattern as shown in FIG. 25B. Then, the substrate 11 was developed with NMD3 solution (Tokyo Ohka Co.) and baked for 120 minutes at a temperature of 150° C. to form a white reflecting layer 20 functioning also as a spacer for separating the substrates from each other on a portion of the non-modulation region of the observation side substrate.

These two substrates thus formed was manufactured into a liquid crystal cell by employing the same materials and process as employed in Example 1, and then a quarter wavelength plate 31 and a reflecting plate 30 were attached to the outer surface of the counter substrate 12, thus obtaining a liquid crystal display device of this invention having a structure shown in FIG. 25C.

The reflectance and contrast ratio of this liquid crystal display device were measured under a driving voltage of 4V using the same process as illustrated in Example 1. As a result, the reflectance was found to be as high as 45%. Likewise, the contrast ratio was measured finding a very high value of 6:1.

The thickness of the liquid crystal layer was measured using an interference film thickness meter, finding that the dispersion in thickness throughout the whole surface of the cell was ±0.05 μm indicating a substantially uniform thickness of the cell.

As explained above, the liquid crystal display device according to the first embodiment of this invention is featured in that the non-modulation region thereof is covered with a white reflecting layer, so that the darkness or blackness of the modulation region thereof is made distinct in the black state. Further, since the non-modulation region is covered with a white reflecting layer, the brightness is improved in the white state, so that a reflection type liquid crystal display device which is extremely high in contrast ratio and luminous when it is actually perceived by the eyes can be obtained.

Next, examples according to a second embodiment of this invention will be explained as follows.

EXAMPLE 11

Figure 26:
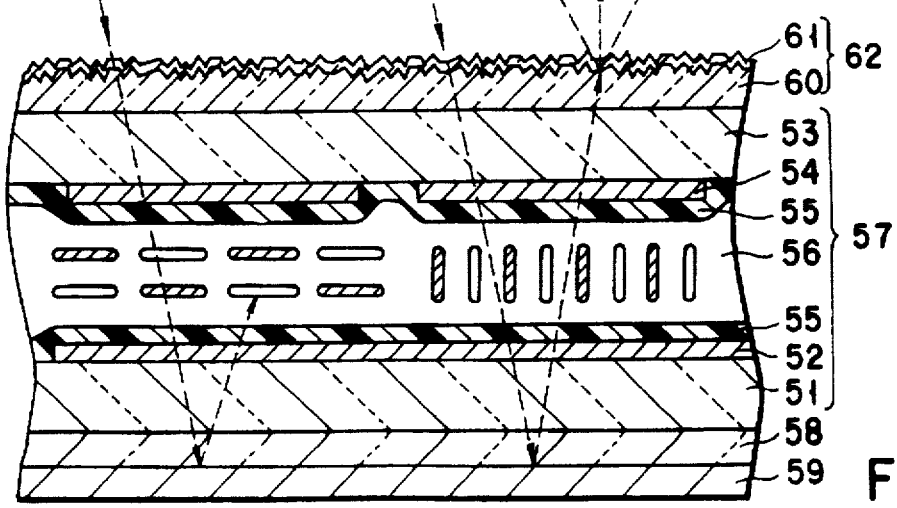
FIG. 26 is a cross-sectional view schematically showing a liquid crystal display device according to Example 11 of this invention.

As shown in FIG. 26, an MIM (Metal-Insulator-Metal) element 52 was formed on a glass substrate 51 having a thickness of 0.7 mm to obtain an MIM device-attached lower substrate having 480×320 pixels. Further, an ITO stripe pattern electrode 54 was formed respectively on the surfaces of the glass substrates 51 and 53 by coating a polyimide material (AL-1051, Nihon Gosei Gomu Co.) and then baking the coating.

Then, after the alignment films 55 were subjected to a rubbing treatment, a spacer material (Micropearl SP, Sekisui Fine Chemical Co.) to be disposed between the substrates and having a particle diameter of 8 µm was dispersed over the surface of the upper substrate 51 at a dispersion density of $100/mm^2$. On the other hand, a peripheral seal pattern provided with an opening 5 mm in width was formed on the peripheral portion of the lower substrate 53 by way of a screen printing by using a one-pack type epoxy resin (XN-21, Mitsui Tohatsu Kagaku Co.).

Thereafter, these two substrates 51 and 53 were superimposed with the electrodes being faced to each other, and then baked for two hours at a temperature of 180° C., while pressing the substrates 51 and 53 in such a manner that the space between the substrates 51 and 53 became identical with the particle diameter of the spacer material, thereby obtaining a blank cell. Subsequently, a liquid crystal material comprising a nematic liquid crystal material (trade name: ZLI-4801-100, Merk Japan Co.) exhibiting a positive dielectric anisotropy and 2.0% by weight of dichroic black dye (trade name: LA103/4, Mitsubishi Kasei Co.) was introduced into the blank cell by way of a vacuum injection method, and then, the opening of the peripheral seal pattern was sealed with an ultraviolet-curing resin (trade name: UV-1000, Sony Chemical Co.), thus obtaining a liquid crystal cell 57 having a liquid crystal layer 56 interposed between the substrates 51 and 53.

Then, a full wavelength-range quarter wavelength plate (phase-shifting) of laminated type (Nitto Denko Co.) 58 and a mirror reflecting plate 59 comprising a glass substrate and a 300 nm thick Al layer deposited at the normal temperature on the glass substrate were successively adhered on the lower surface of the liquid crystal cell formed in this manner. On the other hand, $SnO_2$ was coated on the surface of a glass substrate 60 by way of a splaying method thereby forming a rugged $SnO_2$ layer, on which another $SnO_2$ layer 61 having a lower refractive index was deposited through sputtering, thus forming a light diffusion plate 62 having a function of diffusing light and at the same time a function of preventing the attenuation of an incident light. This light diffusion plate 62 was disposed on the surface of the liquid crystal cell 57, thus preparing a liquid crystal display device.

FIGS. 27A and 27B illustrate the operation of this liquid crystal display device of this invention prepared in this manner. Namely, under a black state where no voltage is being impressed, a non-polarized incident light Li passes through the liquid crystal layer 56 to be turned into a unidirectional linearly polarized light, and then passes through the quarter wavelength plate 58 to be turned into a circularly polarized light which, after reaching to the reflecting plate 30 as it is, is then reflected by the mirror reflecting plate 59. The circularly polarized light thus reflected passes again through the quarter wavelength plate 58. However, since the direction of the resultant linearly polarized light at this moment is rotated by an angle of 90° in relative to the initial linearly polarized light, the reflected linearly polarized light is absorbed by the guest dye (or black dye), resulting in that it can not be emitted as a reflection light.

On the other hand, under a white state where a voltage is being applied, since the molecular orientation of the liquid crystal of the liquid crystal layer 56 containing the guest dye becomes in parallel with the direction of the normal line of the substrate, a non-polarized incident light Li injected in the direction of the normal line of the substrate is not polarized but passes through the quarter wavelength plate 58 as it is and then reflected by the reflecting plate 59. Therefore, this reflected light Lr is not absorbed by the dye molecules as it passes through the liquid crystal layer 56 again, but is emitted as a reflected light Lr. In this case, if the reflected light Lr is emitted out as it is, the luminance of the liquid crystal display device becomes predominantly high at a region around the direction of the normal line of the substrate. However, since the reflected light Lr passes through the light diffusion plate 62 having a rugged surface and is diffused by this light diffusion plate 62, a display which is bright and free from a visual angle dependency can be obtained.

The liquid crystal display device of this Example which can be optically controlled in this manner was measured with respect to the light reflectance and the contrast ratio thereof on the basis of the luminance of a standard diffusion plate (MgO plate) defined as 100% reflectance.

Namely, when a voltage was applied to the MIM devices of the entire surface (all pixels) so as to adjust the voltage impressed to the liquid crystal layer 56 to become 4 volts, a high reflectance of as high as 86% could be obtained. Further, when the contrast ratio was measured by applying voltages to the entire pixels so as to adjust the voltage impressed to the liquid crystal layer to become 0 volt on one hand, and 4 volts on the other hand by using MIM device, a high contrast ratio of as high as 20:1 could be obtained.

Furthermore, when the liquid crystal display device of this Example was actuated to display in three different ways, i.e. a stripe pattern wherein display lines were alternately displayed into white and black; a square pattern, each consisting of 30×30 pixels was turned into black; and a square pattern, each consisting of 30×30 pixels was turned into white, there was not recognized any substantial parallax.

EXAMPLE 12

As shown in FIG. 28, after vapor-depositing aluminum to a thickness of 300 nm on a glass substrate 63 having a thickness of 1.1 mm, a stripe pattern consisting of 480 lines, each line having a width of 300 µm, the space between lines being 10 µm and the length of each line being 240 mm, was formed on the glass substrate 63, thereby obtaining an electrode (a scanning electrode) 64 functioning also as a mirror reflecting plate. On the other hand, an ITO film was formed on a glass substrate 65 having a thickness of 1.1 mm, and then patterned into a stripe pattern consisting of 640 lines, each line having a width of 300 µm, the space between lines being 10 µm and the length of each line being 150 mm, thereby obtaining a transparent electrode (signal electrode) 66 made of ITO.

Then, a monobasic chromium complex was coated on the Al electrode 64-bearing surface of a first substrate (a lower substrate) as well as on the ITO transparent electrode 66-bearing surface of a second substrate (a upper substrate) thereby forming an alignment film 67 respectively. Then, after the alignment films 67 were subjected to a rubbing treatment, these substrates were faced to each other in a such a manner that the Al electrode 64 and the ITO transparent electrode 66 intersect at right angles, and at the same time, a sealing portion 68 and a spacer 69 were incorporated in the same manner as in the case of Example 11. Thereafter, a liquid crystal composition was introduced into a space between these upper and lower substrates, thus forming a liquid crystal layer (3.4 μm thick) and preparing a driving liquid crystal cell 71.

The rubbing treatment on the first and second substrates was performed in such a manner that the direction of the rubbing on the first substrate was opposite and parallel to the direction of the rubbing on the second substrate as shown by the arrows "a" and "a'", and that the liquid crystal molecules in the liquid crystal layer 70 were vertically aligned at a pretilt angle of about 89° at the surface of the substrates. As a liquid crystal to be interposed between these substrates, ZLI-2585 (Merk Japan Co.) exhibiting a negative dielectric anisotropy was employed. The refractive anisotropy "Δn" of this liquid crystal was 0.039 at the wavelength of 550 nm. The retardation value to be obtained by multiplying the value of "Δn" of this liquid crystal 20 by the thickness "d" of this liquid crystal 20 in the liquid crystal cell 71 was 0.132 μm (132 nm). The wavelength of 550 nm mentioned above was exemplified as a typical value of wavelength which was considered to be most outstanding in terms of color sensitivity.

Subsequently, a polarizing plate 72 was superimposed on the liquid crystal cell 71 thus obtained in such a manner that the absorption axis "b" thereof was inclined by an angle of 45° from the rubbing direction "a" or "a'" as shown in FIG. 29. On the other hand, $SnO_2$ was coated on the surface of a glass substrate by way of a splaying method thereby forming a rugged $SnO_2$ layer, on which another $SnO_2$ layer having a lower refractive index was deposited through sputtering, thus forming a light diffusion plate 73 having a function of diffusing light and at the same time a function of preventing the attenuation of an incident light. This light diffusion plate 73 was disposed on the surface of the polarization plate 72, thus preparing a liquid crystal display device.

When this liquid crystal display device thus obtained was actuated in a 1/240 duty multiplex mode, the retardation of the liquid crystal cell 71 became substantially zero when no voltage is applied thereto giving a white display, but became approximately a quarter wavelength when a voltage is applied thereto thus giving a black display. Further, the contrast ratio was found to be 10:1, and the reflectance was found to be 30% thus indicating an excellent visibility of the liquid crystal display device.

EXAMPLE 13

A driving liquid crystal cell 71 was prepared in the same manner as illustrated in Example 12 except that ZLI-4850 (Merk Japan Co.) was employed in place of ZLI-2585 as a liquid crystal. The refractive anisotropy "Δn" of this liquid crystal was 0.208 at the wavelength of 550 nm. The thickness "d" of this liquid crystal layer 70 was 4.2 μm. The retardation value to be obtained by multiplying the value of "Δn" of this liquid crystal by the thickness "d" of this liquid crystal layer in the liquid crystal cell 71 was 0.874 μm (874 nm).

Subsequently, a phase-shifting plate 74 and a polarizing plate 72 was superimposed on the liquid crystal cell 71 as shown in FIG. 30. Specifically, the phase-shifting plate 74 made of an oriented polycarbonate film having a retardation value of 125 nm (a quarter wavelength) was superimposed on the liquid crystal cell 71 in such a manner that the absorption axis "c" thereof intersected the rubbing direction "a" or "a'" at right angles, and then the same polarization plate 72 as used in Example 12 and a light dispersion plate 73 were successively stacked over the phase-shifting plate 74 whereby obtaining a liquid crystal display device.

When this liquid crystal display device thus obtained was actuated in a 1/240 duty multiplex mode, the difference in retardation value between the phase-shifting plate 74 and liquid crystal cell 71 became approximately a quarter wavelength when no voltage is applied thereto thus giving a black display, but became 3/2 wavelength when a voltage is applied thereto thus giving a white display. Further, the contrast ratio thereof was found to be 13:1 which was higher than that in Example 12, and the reflectance was found to be 28% thus indicating an excellent visibility of the liquid crystal display device.

EXAMPLE 14

A liquid crystal display device was prepared in the same manner as illustrated in Example 13 except that the retardation value of the phase-shifting plate 74 was set to 250 nm.

When this liquid crystal display device thus obtained was actuated in a 1/240 duty multiplex mode, the difference in retardation value between the phase-shifting plate 74 and liquid crystal cell 71 became approximately a half wavelength when no voltage is applied thereto thus giving a white display, but became 5/4 wavelength when a voltage is applied thereto thus giving a black display. Further, the contrast ratio thereof was found to be 10:1, and the reflectance was found to be 35% thus indicating an excellent visibility of the liquid crystal display device.

In the above examples, a glass substrate depositing thereon a rugged film of $SnO_2$ was employed as a light diffusion plate. However, it is also possible to use other kind of substrate as long as it is capable of avoiding any attenuation of incident light and at the same time obtaining a sufficient diffusion effect. For example, a glass plate having its surface roughened through etching can be satisfactorily employed.

In Examples 12 to 14, an Al electrode functioning also as a reflection plate was employed as a scanning electrode, and an ITO transparent electrode was employed as a signal electrode for performing a multiplex driving. However, the arrangement of these electrodes may be reversed. Further, in these examples, a liquid crystal cell of vertically aligned ECB mode was employed. However, almost the same effect as obtained with this mode can be obtained with the employment of a liquid crystal cell of horizontally aligned ECB mode, or STN (Super Twisted Nematic) mode. It is possible to obtain almost the same effect as obtained in these examples by employing a liquid crystal display device provided with a switching element consisting of MIM or TFT (thin film transistor) as a driving system, or a color liquid crystal display device provided with a color filter as long as the basic structure of this invention is adopted therein.

As explained above, it is possible according to the second embodiment of this invention to realize a reflection type liquid crystal display device having an excellent reflectance, a high contrast ratio and an excellent visibility.

Next, examples according to a third embodiment of this invention will be explained as follows.

EXAMPLE 15

The liquid crystal display device of this example will be explained with reference to FIGS. 31 to 33, and to FIGS. 13A to 13D and FIGS. 15A to FIG. 16 which are referred to in Example 1.

A couple of glass substrates, each having a thickness of 0.7 mm were employed. Namely, $SiO_x$ was deposited on the upper substrate 11 of the observation side to form a 600 nm thick $SiO_x$ layer 19, which was then patterned into the pattern A shown in FIG. 31. Over this pattern A was then formed a pattern of electrode 13 provided with an MIM device 18 as shown in FIGS. 13A and 13B. FIG. 13A shows the shape of electrode of one pixel, which is 180 μm×180 μm in length and breadth. FIG. 13B shows the shape of effective display region of the upper substrate 11 wherein the pixels are arrayed in the form of matrix wherein 480×320 pixels are arrayed within an area of 57.6 mm×86.4 mm.

As shown in FIG. 32, an MIM device 18, a wiring 22 and a transparent electrode 13 were formed on the upper substrate of the observation side. Further, as shown in FIG. 33, the $SiO_x$ layer 19 and the ITO layer 13 were distributed in a two-dimensional manner. The refractive index of $SiO_x$ was 1.50, while the refractive index of ITO was 1.90, the difference in refractive index (δn) being 0.40. The thickness (D) of these layers were 600 nm, so that δnD was 0.24 μm. These layers were to be made into a diffraction grating to function as a light diffusion layer.

The ITO electrode layer constitutes a pixel electrode and is indispensable. As mentioned above, the refractive index of ITO is as high as 1.90 so that it may cause an unnecessary reflection at the interface thereof with another layer (for example, the glass substrate and the alignment film exhibit a refractive index of 1.90 giving a large difference in refractive index, so that interface reflection is more likely to be brought about). However, since the surface of the ITO layer in this Example is roughened, the reflected light components can be diffused, hence the influence of the reflected light to the contrast of display can be minimized as compared with the conventional structure.

On the other hand, the lower substrate 12 disposed on the opposite side was provided with a plurality of stripe-shaped transparent electrodes 14 arranged to correspond to and in parallel with the above-mentioned pixel electrodes 13. Alignment films 16 and 17 were deposited on these electrodes 13 and 14 respectively, and a liquid crystal composition layer was interposed between these substrates.

The liquid crystal display device according to this Example 15 can manufactured as follows.

First of all, a first Ta layer 18a having its surface being oxidized (a 100 nm thick $TaO_2$ was formed) was formed so as to form a pattern as shown in FIG. 13A on the surface of the upper substrate 11. Then, a second Ta layer 22 (100 nm) was formed so as to form a wiring pattern, a portion of which overlapping the first Ta layer 18a as shown in FIG. 13A.

Subsequently, a 200 nm thick ITO film was formed all over the surface the upper substrate, and then a positive resist material (OFPR-5000, Tokyo Ohka Co.) was coated all over the ITO film. After being subjected to a preliminary baking for 30 minutes at a temperature of 60° C., the substrate was further subjected to a light exposure using a mask so as to form a pixel electrode pattern and then to a development with NMD3 solution (Tokyo Ohka Co.) thereby forming a resist pattern covering only the region of the ITO film indicated by the reference numeral 13 as shown in FIG. 13A.

Then, the etching of ITO film was performed with an aqueous mixed solution of hydrochloric acid and nitric acid (mixing ration: 10 hydrochloric acid:1 nitric acid:10 water) using the resist pattern as a mask. Thereafter, the resist pattern was removed.

Further, a substrate provided with an ITO stripe pattern electrode 14 as indicated in FIGS. 13C and 13D was prepared as a counter substrate 12. FIG. 13C illustrates the shape of pattern representing one pixel, and FIG. 13D shows the shape of the effective display region 12a.

On the effective display region of each of these two substrates thus treated was formed alignment films 16 and 17 respectively by first printing an aligning agent (AL-1051, Nihon Gosei Gomu Co.) on the effective display region and then baking the aligning agent. Subsequently, these alignment films 16 and 17 were subjected to a rubbing treatment in the direction which is parallel with the stripe pattern of the ITO as well as in such a manner that makes the direction of alignment of the facing substrates reversed to each other by an angle of 180°.

Then, a spacer material (Micropearl SP, Sekisui Fine Chemical Co.) to be disposed between the substrates having a particle diameter of 5 μm was dispersed over a surface of the substrate of observation side at a dispersion density of 100/mm². On the other hand, a peripheral seal pattern provided with an opening 5 mm in width was formed on the peripheral region of the effective display region of the opposed substrate 12 by way of a screen printing. The sealing agent employed in this case was a one-pack type epoxy resin (XN-21, Mitsui Tohatsu Kagaku Co.).

A couple of the substrates 11 and 12 were superimposed with the electrodes 13 and 14 being faced to each other, and then baked for two hours at a temperature of 180° C., while pressing the substrates 11 and 12 in such a manner that the space between the substrates 11 and 12 became identical with the particle diameter of the spacer material, thereby obtaining a blank cell to be employed in a liquid crystal display device of this Example 15. Subsequently, a liquid crystal material comprising a nematic liquid crystal material ZLI-2293 (Merk Japan Co.) 151 exhibiting a positive dielectric anisotropy and 2.0% by weight (based on the liquid crystal material) of a black dye LA 103/4 (Mitsubishi Kasei Co.) was introduced into the blank cell by way of a vacuum injection method, thereby forming a liquid crystal composition layer 15.

Then, the opening of the peripheral seal pattern was sealed with an ultraviolet-curing resin UV-1000 (Sony Chemical Co.), thus obtaining a liquid crystal cell to be used in a liquid crystal display device of this Example 15. Thereafter, a quarter wavelength plate 31 and a reflecting plate 30 were stuck on the substrate 12 to obtain a liquid crystal display device of this Example 15. The reflecting plate 30 employed in this Example was an Al vapor deposition type diffuse reflecting plate (Nitto Denko Co.). The quarter wavelength plate 31 employed was a full wavelength-range quarter wavelength plate of laminated type (Nitto Denko Co.). These plates 30 and 31 used herein were coated with an adhesive.

The reflectance and contrast ratio of the liquid crystal display device of this Example thus obtained were measured with a measuring instrument shown in FIG. 16. In this measurement, a luminance meter 40 was set at a position spaced apart by a distance of 30 cm in the direction of normal line from the center of a sample, and a pair of high color rendering type fluorescent lamps 41 and 42 each emitting three wavelengths of red, green and blue were separately set on both sides of the luminance meter 40 at the same height as that of the luminance meter 40 but separated by an angle of 30° in leftward and rightward from the direction of normal line so as to control the illuminance of the location where the sample was disposed to 580 lux. Under this condition, the luminance of a standard diffusion plate (MgO plate) was measured and the resultant luminance was defined as 100% reflectance, on the basis of which the reflectance and contrast ratio of each sample were measured.

As a result, the reflectance was found to be 80%, and the contrast ratio was found to be 20:1.

EXAMPLE 16

A couple of glass substrates, each having a thickness of 0.7 mm were employed. Namely, $SiO_x$ was deposited on the upper substrate 11 of the observation side to form a 600 nm thick $SiO_x$ layer 19, which was then patterned into the pattern A shown in FIG. 31. Over this pattern A was then formed, through vapor deposition, a 600 nm thick $SiN_x$ layer. Then, without removing this $SiN_x$ layer, a pattern of electrode 13 provided with an MIM device 18 as shown in FIGS. 13A and 13B.

FIG. 13A shows the shape of electrode of one pixel, which is 180 μm×180 μm in length and breadth. FIG. 13B shows the shape of effective display region of the upper substrate 11 wherein the pixels are arrayed in the form of matrix wherein 480×320 pixels are arrayed within an area of 57.6 mm×86.4 mm.

As shown in FIG. 32, an MIM device 18, a wiring 22 and a transparent electrode 13 were formed on the upper substrate of the observation side. Further, as shown in FIG. 33, the $SiO_x$ layer 19 and the ITO layer 13 were distributed in a two-dimensional manner. The refractive index of $SiO_x$ was 1.50, while the refractive index of $SiN_x$ was 2.10, the difference in refractive index ($\delta n$) being 0.60. The thickness (D) of these layers were 600 nm, so that $\delta nD$ was 0.36 μm. These layers were to be made into a diffraction grating to function as a light diffusion layer.

Moreover, on the surface of this light diffusion layer (an inner portion as viewed from the observation side) was disposed a Ta pattern functioning as a wiring for MIM, so that this Ta pattern was adapted to exhibit the same effect as that of the white reflecting layer mentioned above.

After undergoing the same process as in Example 15, the liquid crystal display device of this Example was obtained. When the evaluation of this liquid crystal display device was made in the same manner as in Example 15, the reflectance was found to be 85%, and the contrast ratio was found to be 20:1.

As explained above, it is possible according to the third embodiment of this invention to realize an excellent reflection type liquid crystal display device which is luminous and high in contrast ratio.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A reflecting type liquid crystal display device comprising;
   a first substrate provided on one main surface thereof with a first electrode and disposed on an observation side;
   a second substrate provided on one main surface thereof with a second electrode and disposed to face said first substrate in such a manner that said one main surface bearing said second electrode faces to said one main surface bearing said first electrode;
   a liquid crystal composition layer interposed between said first substrate and said second substrate;
   a modulation region which corresponds to said first electrode and is capable of modulating intensity of reflection of incident light in accordance with a response of said liquid crystal composition to a voltage applied to between said first substrate and said second substrate;
   a non-modulation region occupying a region other than said modulation region;
   a light diffusion layer formed on said surface bearing said first electrode of said first substrate; and
   a first reflecting layer formed on at least a portion of said non-modulation region of said light diffusion layer.

2. The reflecting type liquid crystal display device according to claim 1, which further comprises a second reflecting layer formed any one of the main surfaces of the second substrate.

3. The reflecting type liquid crystal display device according to claim 2, wherein said second reflecting layer is formed at least partially on the surface of the second substrate where a second electrode is formed.

4. The reflecting type liquid crystal display device according to claim 3, wherein said second reflecting layer is used also as a second electrode.

5. The reflecting type liquid crystal display device according to claim 3, wherein said second reflecting layer is formed on the second electrode.

6. The reflecting type liquid crystal display device according to claim 2, wherein said second reflecting layer is formed at least partially on a surface of the second substrate which is opposite to the surface where the second electrode is formed.

7. The reflecting type liquid crystal display device according to claim 2, wherein said second reflecting layer comprises as a main component Al or Ag.

8. The reflecting type liquid crystal display device according to claim 1, wherein a color filter is formed on a surface of the first or the second substrate where an electrode is formed.

9. The reflecting type liquid crystal display device according to claim 1, wherein a color filter is formed on a light diffusion layer, and the second reflecting layer is formed on the color filter.

10. The reflecting type liquid crystal display device according to claim 1, wherein said light diffusion layer is formed of a first and a second transparent refractive index mediums, each having a different refractive index from the other.

11. The reflecting type liquid crystal display device according to claim 10, wherein said first transparent refractive index medium contains as a main component a material selected from the group consisting of polystyrene, $SiO_2$ and polyimide, and the second transparent refractive index medium contains as a main component acrylic material constituting a solvent for the first transparent refractive index medium.

12. The reflecting type liquid crystal display device according to claim 10, wherein said first transparent refractive index medium has a refractive index which is approximately or nearly equal to ordinary refractive index of the liquid crystal composition, and the second transparent refractive index medium has a refractive index which is approximately or nearly equal to abnormal refractive index of the liquid crystal composition.

13. The reflecting type liquid crystal display device according to claim 10, wherein each of the first and the second transparent refractive index mediums has a refractive index falling in a range of: an average refractive index of the liquid crystal composition ±10%.

14. The reflecting type liquid crystal display device according to claim 13, wherein said light diffusion layer is a diffraction grating formed of a first and a second transparent refractive index mediums flatly arrayed.

15. The reflecting type liquid crystal display device according to claim 14, wherein said diffraction grating formed of a first and a second transparent refractive index mediums arrayed in a check pattern.

16. The reflecting type liquid crystal display device according to claim 1, wherein said first transparent refractive index medium contains as a main component a material selected from the group consisting of polystyrene, $SiO_2$ and polyimide and has a refractive index which is approximately or nearly equal to ordinary refractive index of the liquid crystal composition; the second transparent refractive index medium contains as a main component a material selected from ITO and silicon nitride; and a value of $\delta nD$ to be obtained when a value of difference in refractive index $\delta n$ between the second transparent refractive index medium and the first transparent refractive index medium is multiplied by a thickness of the light diffusion layer is in the range of from 0.1 µm to 0.4 µm; said light diffusion layer being a diffraction grating formed of a first and a second transparent refractive index mediums arrayed in a check pattern.

17. The reflecting type liquid crystal display device according to claim 1, wherein said second reflecting layer comprises as a main component Al or Ag, and the light diffusion layer comprises two kinds of transparent refractive index mediums.

18. The reflecting type liquid crystal display device according to claim 1, wherein said liquid crystal composition contains a dichroic dye.

19. The reflecting type liquid crystal display device according to claim 1, wherein said liquid crystal composition is a nematic liquid crystal containing a black dye and exhibiting a positive dielectric anisotropy, molecules thereof being homogeneously oriented between the first and the second substrates, and a quarter wavelength plate and a second reflecting layer are mounted on the second substrate.

20. The reflecting type liquid crystal display device according to claim 19, wherein said quarter wavelength plate and the second reflecting layer are mounted on a surface of the second substrate.

21. The reflecting type liquid crystal display device according to claim 1, wherein said liquid crystal composition has a light-reflecting function, functioning also as a first reflecting layer.

22. The reflecting type liquid crystal display device according to claim 21, wherein said liquid crystal composition is a high molecular dispersion type liquid crystal composition.

23. The reflecting type liquid crystal display device according to claim 22, wherein said high molecular dispersion type liquid crystal composition is of an emulsion type.

24. The reflecting type liquid crystal display device according to claim 23, which is an active matrix type liquid crystal display device comprising either a thin film transistor or a thin film diode.

25. The reflecting type liquid crystal display device according to claim 24, wherein said first reflecting layer has a function of an interconnection wiring connected to either a thin film transistor and a thin film diode.

26. The reflecting type liquid crystal display device according to claim 1, wherein a reflecting plate comprising a concave mirror reflecting lens is disposed on a surface of the second substrate which is opposite to where the second electrode is formed.

* * * * *